(12) United States Patent
Scrivner et al.

(10) Patent No.: US 11,080,144 B2
(45) Date of Patent: Aug. 3, 2021

(54) SYSTEM AND METHOD FOR MANAGING BLOCKCHAIN NODES

(71) Applicant: Coinbase, Inc., San Francisco, CA (US)

(72) Inventors: Eric Scrivner, San Francisco, CA (US); Maksym Naboka, San Francisco, CA (US); Ales Katona, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 0 days.

(21) Appl. No.: 17/023,716

(22) Filed: Sep. 17, 2020

(65) Prior Publication Data

US 2021/0004297 A1 Jan. 7, 2021

Related U.S. Application Data

(63) Continuation-in-part of application No. 16/773,149, filed on Jan. 27, 2020, now Pat. No. 10,839,777.

(60) Provisional application No. 62/901,705, filed on Sep. 17, 2019, provisional application No. 62/950,252, filed on Dec. 19, 2019, provisional application No.
(Continued)

(51) Int. Cl.
| | |
|---|---|
| *G06F 7/02* | (2006.01) |
| *G06F 16/00* | (2019.01) |
| *G06F 11/14* | (2006.01) |
| *G06F 16/27* | (2019.01) |
| *G06F 16/23* | (2019.01) |
| *G06F 21/60* | (2013.01) |

(52) U.S. Cl.
CPC ...... *G06F 11/1451* (2013.01); *G06F 16/2379* (2019.01); *G06F 16/27* (2019.01); *G06F 21/602* (2013.01); *G06F 2201/80* (2013.01); *G06F 2201/82* (2013.01); *G06F 2201/84* (2013.01)

(58) Field of Classification Search
CPC ............ H04L 29/08; G06Q 20/3672; G06Q 20/3678; G06F 16/00; G06F 16/2379; G06F 16/22; G06F 16/2365; G06F 16/27; G06F 21/602; G06F 2201/80; G06F 2201/82; G06F 2201/84
See application file for complete search history.

(56) References Cited

U.S. PATENT DOCUMENTS

| | | |
|---|---|---|
| 10,505,623 B2 | 12/2019 | Metzger et al. |
| 2017/0206140 A1 | 7/2017 | Smith et al. |

(Continued)

FOREIGN PATENT DOCUMENTS

| | | |
|---|---|---|
| WO | 2017066715 A1 | 4/2017 |
| WO | 2019067989 A1 | 4/2019 |

OTHER PUBLICATIONS

"Bison Trails is the easiest way to run infrastructure multiple blockchains", http://web.archive.org/web/20190914011319/https://bisontrails.co/, Sep. 14, 2019, pp. 1-9.
(Continued)

*Primary Examiner* — Bruce M Moser
(74) *Attorney, Agent, or Firm* — Jeffrey Schox; Diana Lin

(57) ABSTRACT

Systems and methods for managing blockchain nodes. Blockchain node clusters are created and used to process blockchain requests. Blockchain clusters are managed by adding nodes to a cluster, stopping nodes in the cluster, and generating snapshots of state. of one or more nodes.

21 Claims, 12 Drawing Sheets

Related U.S. Application Data

62/797,026, filed on Jan. 25, 2019, provisional application No. 62/822,574, filed on Mar. 22, 2019.

(56) References Cited

U.S. PATENT DOCUMENTS

| | | |
|---|---|---|
| 2018/0089041 A1 | 3/2018 | Smith et al. |
| 2019/0013934 A1 | 1/2019 | Mercuri et al. |
| 2019/0288771 A1* | 9/2019 | Metzger et al. |
| 2020/0004855 A1* | 1/2020 | Chepak, Jr. ......... G06F 16/2458 |
| 2020/0067697 A1* | 2/2020 | Puddu .................. G06F 21/602 |
| 2020/0134139 A1 | 4/2020 | Vaish et al. |
| 2020/0143372 A1* | 5/2020 | Liu ...................... H04L 9/0643 |

OTHER PUBLICATIONS

"Coinbase Details 'Snapchain' Block Syncing Solution," https://vmvirtualmachine.com/coinbase-details-snapchain-block-syncing-solution/, Jan. 27, 2019. (Year: 2019).

Shieber, Jonathan, "AWS opens up its managed blockchain as a service to everybody", TechCrunch, Apr. 30, 2019, pp. 1-10.

"How to run Ethereum Mainnet node on AWS", Rumble Fish Software Development—Medium, May 25, 2018, pp. 1-13.

Lardinois, Frederic, "Microsoft wants to make blockchain networks enterprise-ready with its new Coco Framework", www.techcrunch.com, Aug. 10, 2017, pp. 1-11.

International Search Report and Written Opinion for application No. PCT/US20/51179 dated Feb. 8, 2021.

* cited by examiner

SYSTEM AND METHOD FOR MANAGING BLOCKCHAIN NODES

CROSS-REFERENCE TO RELATED APPLICATIONS

This application claims the benefit of U.S. Provisional Application No. 62/901,705, filed 17 Sep. 2019, and U.S. Provisional Application No. 62/950,252, filed 19 Dec. 2019, which are each incorporated herein in its entirety by this reference.

This application is continuation-in-part of U.S. application Ser. No. 16/773,149, filed 27 Jan. 2020, which claims the benefit of U.S. Provisional Application No. 62/797,026 filed 25 Jan. 2019 and US Provisional Application No. 62/822,574 filed 22 Mar. 2019, which are each incorporated herein in its entirety by this reference.

TECHNICAL FIELD

This invention relates generally to the computer networking field, and more specifically to a new and useful system and method for managing blockchain nodes.

BACKGROUND

Many companies are building blockchain infrastructures within their networks and systems in order to take advantage of their many capabilities. Blockchains are linked lists of blocks, where each block contains modifications to the global state. Blockchains are decentralized, peer-to-peer systems, with no central authorities propagating changes to the network. Instead, blockchain nodes validate, detect, and relay state updates. For example, whenever someone wants to send funds into a particular blockchain platform, they can log into their app, where a deposit address is displayed. They may use a wallet to control and send their funds. The blockchain platform can detect they actually did send funds to an address controlled by the platform by querying these nodes. The platform pings these nodes to determine whether the transaction occurred. Thus, blockchain nodes are critical to the business operations of any company invested in building a blockchain architecture. Without the nodes, the platform would be unable to interact with the blockchain network in any substantive way. Thus, companies typically wish to deploy and redeploy nodes within the blockchain infrastructure as quickly and efficiently as possible.

Blockchains contain a large amount of data, which is known as the "chain state". Often, services incorporating blockchains need to start up nodes, and need to have those nodes contain the entire chain state when they start up. Starting up and syncing a node to the chain state from scratch would typically take several days, weeks, or months to complete, depending on which protocol is implementing the blockchain. This is undesirable especially for larger scale services and operations that rely on blockchain, and those for which new nodes being created is a time-critical matter.

Furthermore, when upgrading a node to a newer version, if something goes wrong and the blockchain state was used to upgrade, rolling back becomes very challenging. If snapshots exist for the chain state so that the state can be rolled back to the snapshot, if they're not versioned, then there's no way to ensure safe upgrades and rollbacks.

A full sync from the network on every deploy is not a viable solution. First, the pace of development in the blockchain and cryptocurrency ecosystems are rapid. Second, the safety and reliability constraints of blockchain infrastructures demand safe, fast, and efficient syncing of nodes on short notice. Third, node upgrades are often time-sensitive and require fast upgrades and rollbacks. Fourth, the platform may require access to abandoned chain forks, which are oftentimes overwritten by the blockchain network.

Thus, there is a need in the computer networking field to create a new and useful system and method for syncing blockchain nodes. The source of the problem, as discovered by the inventors, is a lack of methods for syncing nodes very quickly while still ensuring accuracy and regular updates. This invention provides such a new and useful system and method.

DESCRIPTION OF THE PREFERRED EMBODIMENTS

Figure 1A:
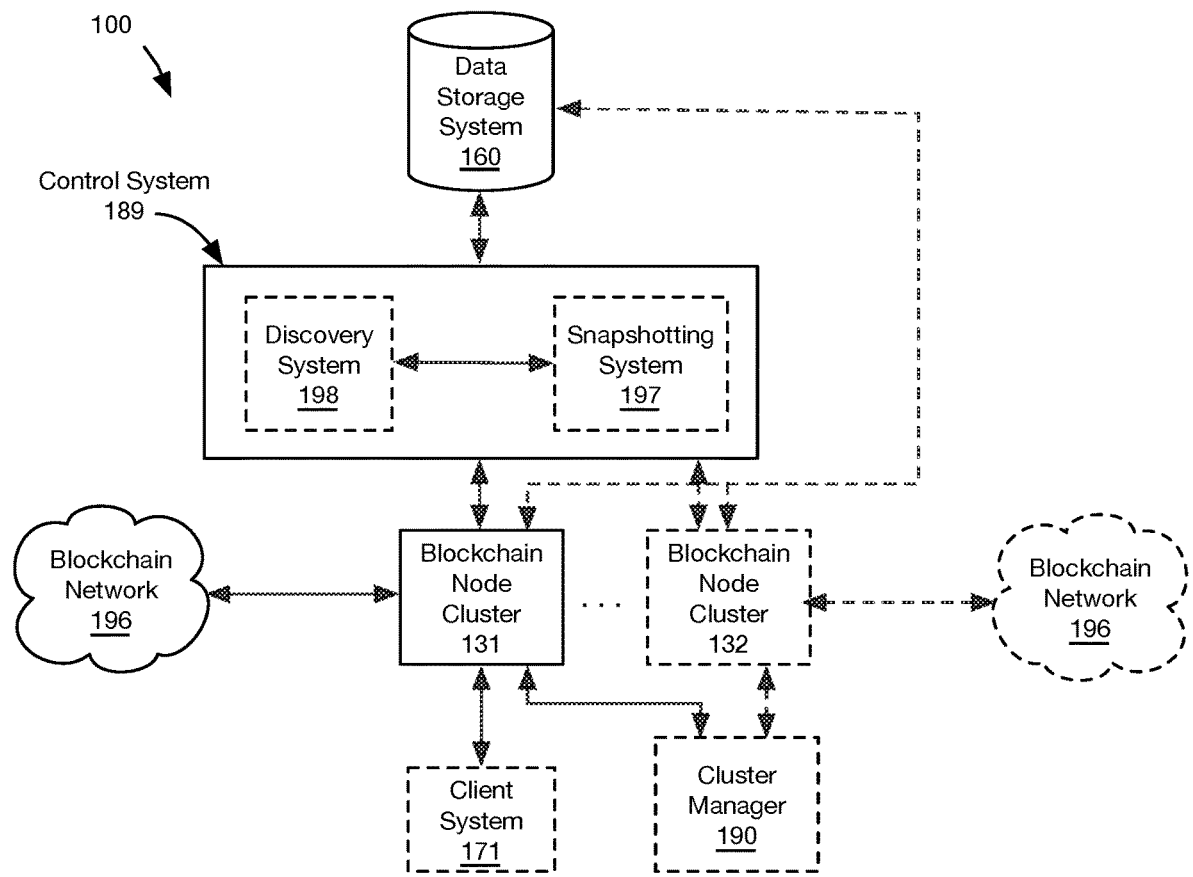
FIG. 1A is a schematic representation of a system, in accordance with variations.

The following description of the preferred embodiments is not intended to limit the disclosure to these preferred embodiments, but rather to enable any person skilled in the art to make and use this disclosure.

1. Overview.

Variations disclosed herein relate to a system and method for managing blockchain nodes. The system can include a control system (e.g., 189 shown in FIG. 1A) that functions to manage at least one blockchain node cluster (e.g., 131). The system and method function to generate snapshots of chain state of healthy blockchain nodes and initializing chain state of newly deployed nodes by using the chain state snapshots.

New blockchain nodes can be started for processing requests received from client systems. Client systems can include any type of system that is requesting to record a transaction on the blockchain (e.g., a digital wallet application, etc.). Once started, blockchain nodes can service traffic received via a blockchain network that communicatively couples the blockchain nodes and one or more client systems (e.g., 171). Several blockchain nodes can be started for a single blockchain. For example, several blockchain nodes that implement a Bitcoin protocol (e.g., 151, 152 shown in FIG. 1C) can be started to process requests to record Bitcoin transactions on the Bitcoin blockchain. Blockchain nodes can be started or stopped on demand to account for changes in blockchain network traffic. As demand increases, more nodes can be started, as demand decreases, nodes can be shut down or suspended to conserve compute resources.

During startup of a new blockchain node, the blockchain node loads the state of the blockchain being managed by the blockchain node. For example, for a Bitcoin node, the blockchain node can load the entire Bitcoin blockchain (including all blocks included in the blockchain) into one or more of a memory (e.g., 422 shown in FIG. 4) and a storage device (e.g., 405 shown in FIG. 4) of a node. The blockchain node can optionally load blockchain metadata (e.g., additional data related to the blockchain, but not recorded in a block of the blockchain). In some variations, rather than copying the entire blockchain from a storage system (e.g., 160) to a storage medium of the node (e.g., 405), the node can mount a datastore volume (e.g., 417) (e.g., snapshot repository) containing a copy of one or more snapshots of the blockchain at a particular moment in time. This datastore volume (e.g., snapshot repository) can store historical chain states for the blockchain (e.g., historical blocks for the blockchain), wherein the new node can reference the datastore volume for historical chain states (e.g., read historical chain states off the datastore volume), and sync only new blocks from the blockchain (e.g., since the last chain state stored in the datastore volume). This datastore volume (e.g., 417) can be concurrently or serially mounted to one or more nodes, and can be continuously or intermittently updated with snapshots of the blockchain from the connected nodes. Alternatively, the entire chain state can be copied (e.g., loaded, written, read, etc.) into the storage medium of the node from one or more incremental snapshots stored by a storage system (e.g., data storage system 160, datastore volume 417 etc.), thereby avoiding incrementally downloading and verifying the chain state (e.g., block-by-block) from the blockchain peers.

In some variations, a snapshot of the blockchain is generated by stopping a blockchain node that is in a started state, and when the blockchain node is in a stopped state, creating an image of at least a portion of the corresponding node's storage device; the created image is stored as a snapshot of the blockchain node. After the image is created, the blockchain node is re-started, and the node synchronizes with blockchain nodes coupled to the blockchain network to update blockchain state stored by the node.

In some variations, a system (e.g., 100) includes at least one blockchain node cluster. Each blockchain node cluster can be communicatively coupled to one or more respective blockchain networks and one or more client systems. The system can optionally include one or more of a blockchain node discovery system (e.g., 198) and a snapshotting system (e.g., 197). A blockchain node discovery system can record state (and optionally configuration) for blockchain node clusters. A snapshotting system can be used to generate snapshot images of nodes included in blockchain clusters, and deploy new blockchain nodes by using snapshots.

The method (e.g., 200 shown in FIG. 2) can include creating a blockchain node cluster, processing requests with the blockchain node cluster, and optionally managing the blockchain node cluster. Creating a blockchain node cluster can include starting a blockchain node included in the blockchain node cluster. Managing the blockchain node cluster can include stopping a blockchain node included in the blockchain node cluster. Managing the blockchain node cluster can optionally include snapshotting a blockchain node included in the blockchain node cluster.

In some implementations, at least one component of the system (e.g., 100) performs at least a portion of method (e.g., 200).

All or portions of the method can be performed at a predetermined frequency, performed upon occurrence of an execution event, or performed at any other suitable time.

2. Benefits.

The systems and methods can confer several benefits.

First, by virtue of initializing chain state using a snapshot of blockchain state, fast snapshotting and restoring of the chain state of a blockchain node can be performed. Use of a snapshot can improve the time-to-sync-from-network (TTSFN) whenever a new node comes online.

Second, by virtue of dynamically selecting a node to be snapshotted (rather than designating a particular node as a dedicated snapshotter), resource allocation can be improved, as all nodes can function to process network traffic. In some variations, a centralized component of the platform (e.g., a snapshotting system, controller, gateway, etc.) selects the node to be snapshotted, and an agent stops the node and performs the snapshotting. By virtue of such an arrangement, a dedicated node does not need to be set aside for snapshotting, and all nodes can be used to process blockchain traffic, until one (or more) nodes are stopped for snapshotting. This also allows low-traffic nodes to be preferentially selected for snapshotting (and/or traffic can be dynamically rerouted to other nodes within the cluster), thereby preserving overall network performance.

Third, by virtue of using centralized component of the platform (e.g., a snapshotting system, a controller, a gateway, etc.) that has access to state and health of the nodes to select the node to be snapshotted, intelligent selection of such a node can be performed based on state of the nodes in a node cluster and/or based on health information obtained by the centralized component. In variants, health checking can additionally be performed by the centralized component (e.g., wherein the nodes can send telemetry and attributes used for the health check to the centralized system), which allows the health checks to be easily updated in a central location, instead of requiring individual node updates.

Fourth, variations can provide improved deployment of node clusters, since cluster management is performed by the platform 100 (e.g., by using clusters, a discovery system, a snapshotting system, gateways, and agents that are at least partially agnostic to specific node implementations), and existing nodes can be deployed on the platform without modification of the node. Moreover, the platform can be configured to support new types of nodes by updating configuration of centralized components (e.g., controllers, agents), without updating implementation of components of the platform. In variants, this architecture can additionally enable third parties to quickly start new nodes by using a generic agent that accesses snapshots from a common snapshotting repository. In variants, this architecture can optionally enable facile node management, particularly when the platform can automatically detect and manage the new nodes.

3. System.

The system can include: a control system (e.g., 189), a storage system (e.g., 160), a cluster of blockchain nodes with paired agents, and a gateway for the cluster. The system functions to: initialize new nodes, quickly load the chain state for the respective blockchain onto the new node, monitor node health, route client blockchain requests to nodes, and coordinate chain state snapshotting (e.g., by controlling node operation).

FIGS. 1A-D show variations of a system 100. In some variations, the system 100 includes one or more blockchain node clusters (e.g., 131, 132, shown in FIG. 1A). In these variants, the control system 189 can optionally include a snapshotting system 197, a discovery system 198, and/or other subsystems. In these variants, each cluster is communicatively coupled to a control system (e.g., 189 shown in FIG. 1A). In variants, the components of the control system, such as one or more of a discovery system and a snapshotting system, are communicatively coupled to a data storage system (e.g., 160). A blockchain node cluster can be directly coupled to the data storage system, or indirectly coupled to the data storage system via the snapshotting system. A blockchain node cluster can be communicatively coupled to one or more blockchain networks (e.g., 196).

Figure 1B:
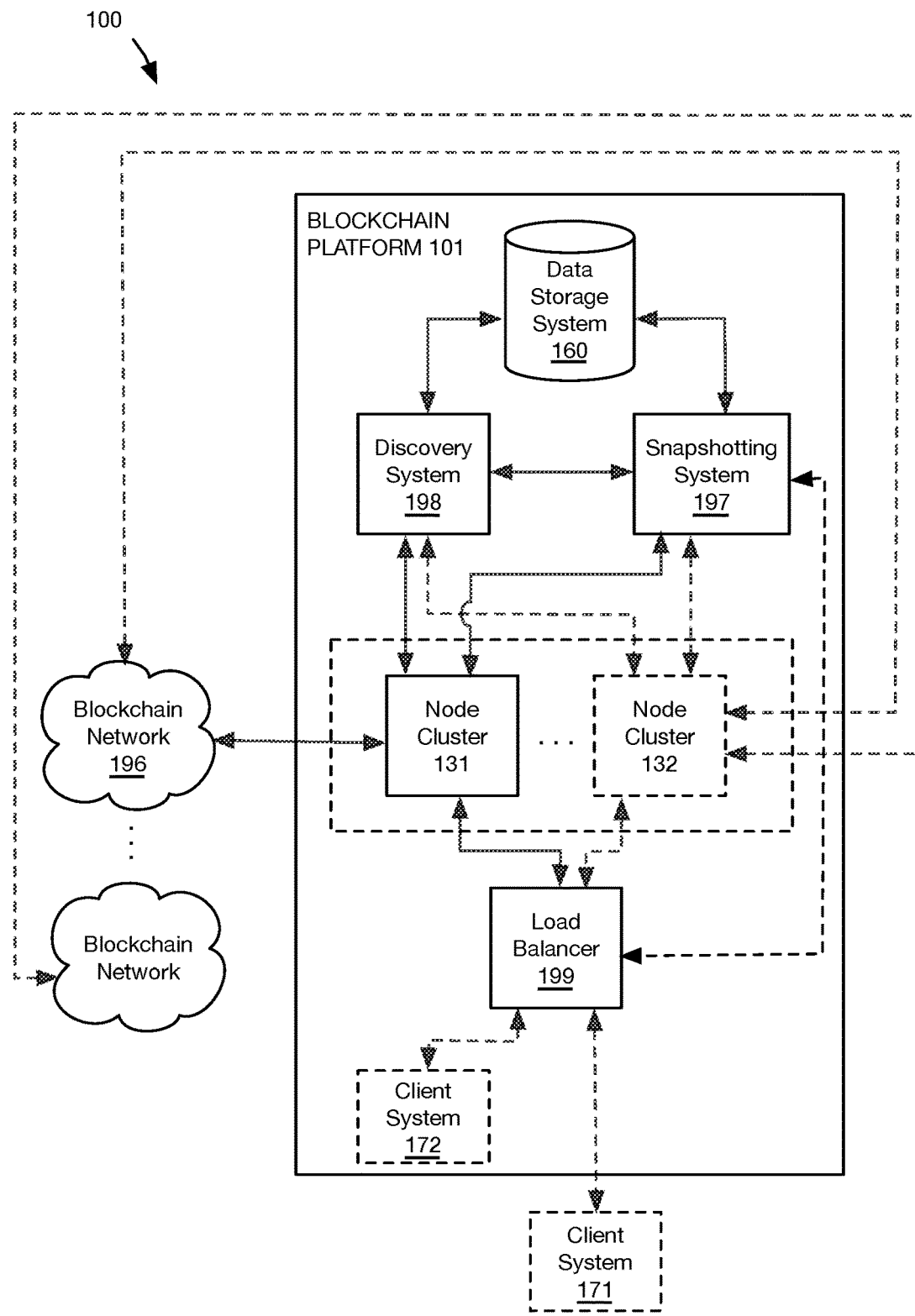
FIG. 1B is a schematic representation of a blockchain platform, in accordance with variations.

One or more components of the system can be included in a blockchain platform (e.g., 101, shown in FIG. 1B).

The clusters of nodes (e.g., 131, 132) function to service traffic requests (e.g., sending transactions to the blockchain network, returning blockchain values, etc.). The system preferably includes a plurality of clusters, wherein each cluster (and associated gateway) is specific to a blockchain network, but can alternatively include a single cluster associated with a plurality of blockchain networks. The system can include clusters for one or more blockchain networks. The system can include one or more clusters for each blockchain network (e.g., each mainnet, each testnet, etc.).

Clusters can be communicatively coupled to one or more client systems (e.g., 171) either directly (as shown in FIG. 1A), or indirectly via one or more routing components (e.g., via a load balancer 199, as shown in FIG. 1B). Client systems can include client systems that are included in a blockchain platform (e.g., 172 shown in FIG. 1B). Additionally, or alternatively, client systems can be external to a blockchain platform (e.g., 171 shown in FIG. 1B).

Figure 1C:
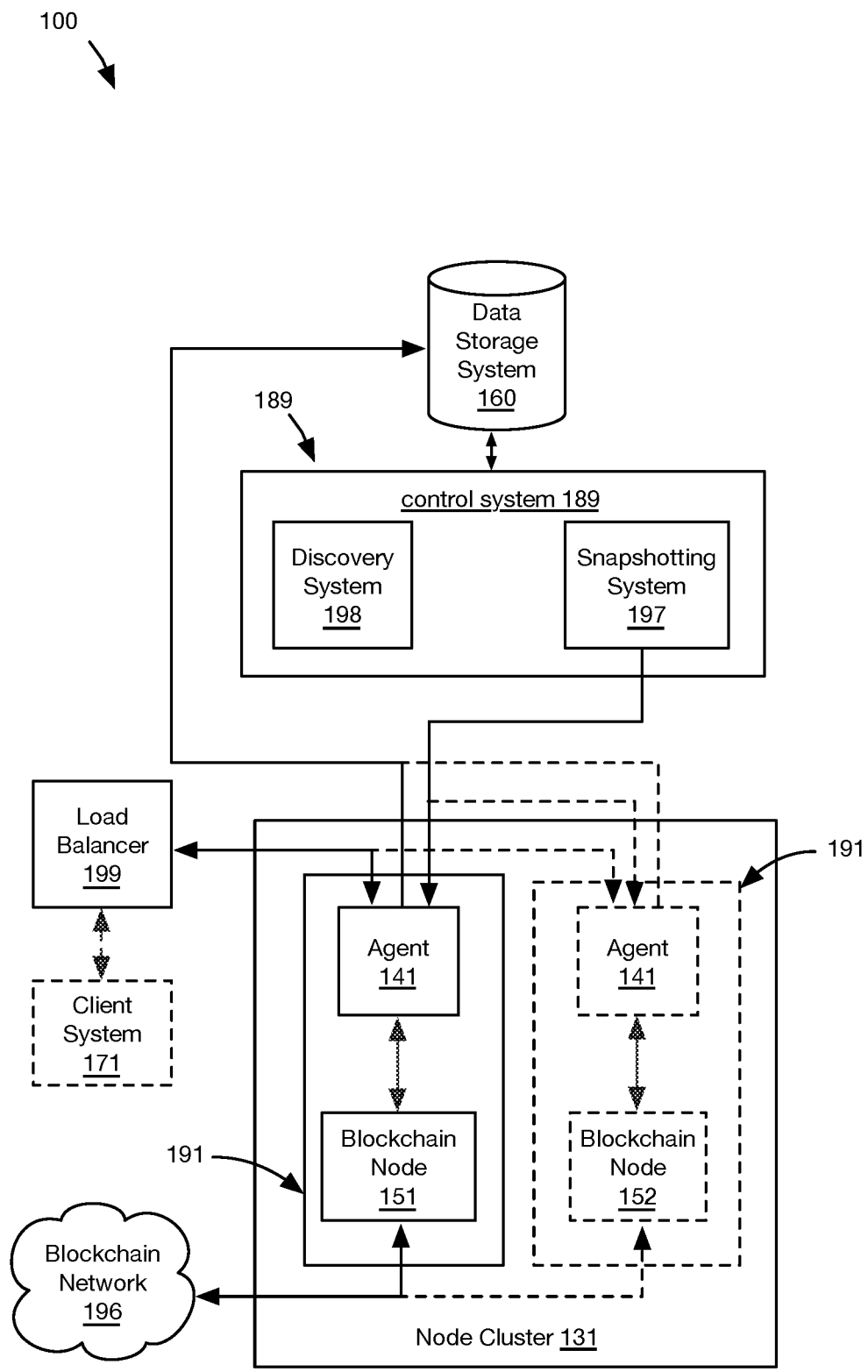
FIG. 1C is a schematic representation that shows components of a node cluster, in accordance with variations.
Figure 1D:
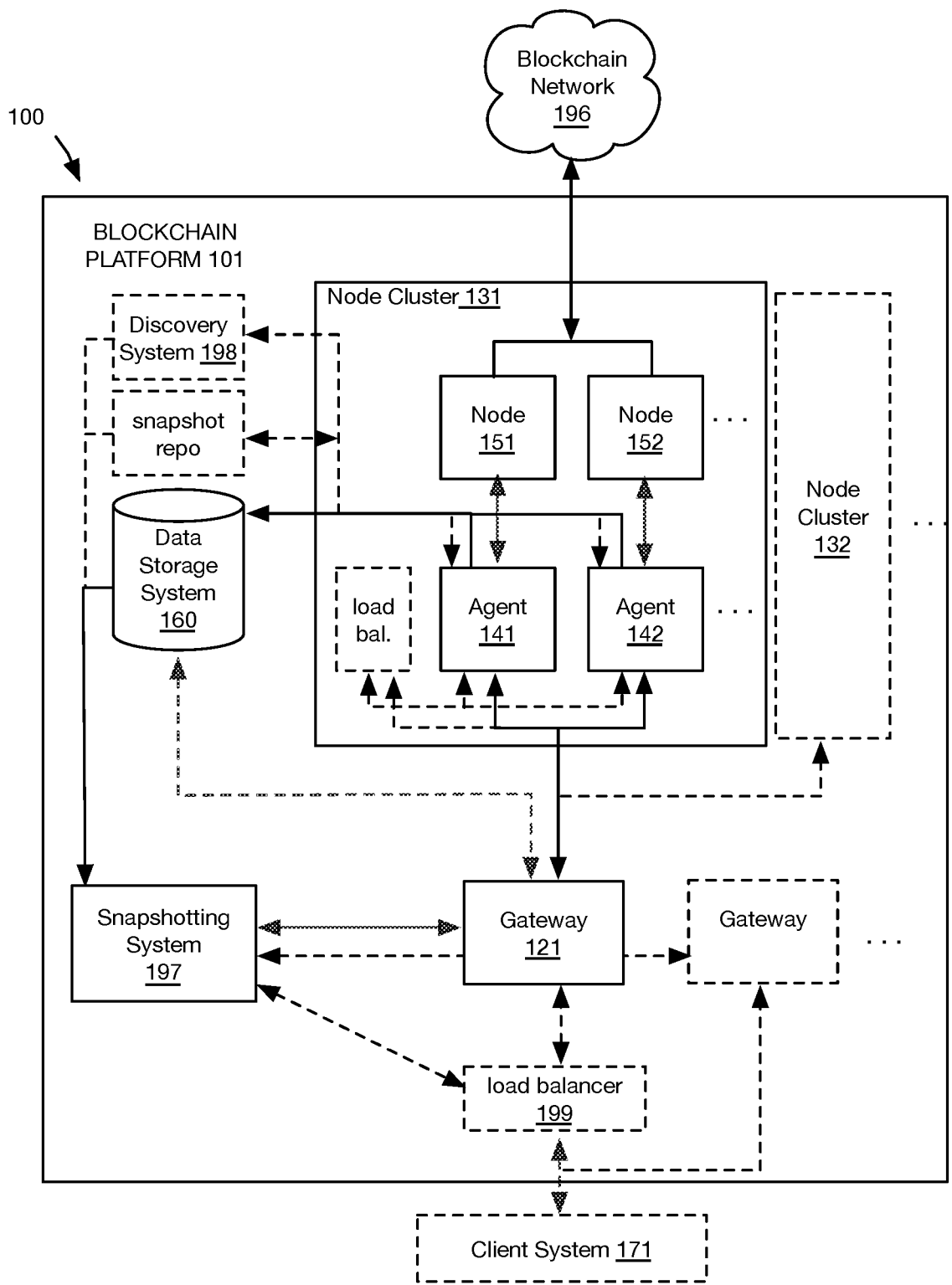
FIG. 1D is a schematic representation of a system that includes gateways, in accordance with variations.

A node cluster (e.g., 131) can include one or more blockchain nodes (e.g., 151, 152 shown in FIG. 1C). The nodes are preferably for the same blockchain network, but can alternatively be for different blockchain networks.

Each blockchain node preferably includes machine-executable program instructions that implements a blockchain protocol for the respective blockchain network, but can be otherwise constructed. During operation, each node preferably also includes a copy of the chain state for the respective blockchain. This chain state can be retrieved (e.g., copied, loaded, mounted, etc.) from a prior snapshot of a different node, be synchronized with the blockchain network's peers (e.g., downloaded from the blockchain network on a block-by-block basis and verified using the blockchain protocol), or otherwise obtained. Each node is preferably executed in an independent compute instance (e.g., virtual compute environment, such as a virtual machine or container, physical compute environment, such as a bare metal machine, etc.), but can alternatively share compute instances with other nodes.

Each blockchain node (e.g., 151-152) functions to sync a respective blockchain (e.g., by saving blocks from the blockchain). The blockchain nodes can optionally function to manage a blockchain (e.g., by writing blocks to the blockchain). The blockchain nodes preferably function as full nodes, but can optionally function as lightweight nodes.

In variants, the blockchain nodes synchronize with the respective blockchain network (e.g., 196) using a blockchain protocol.

The system 100 can include blockchain nodes for different blockchains (e.g. a Bitcoin blockchain, an Ethereum blockchain, an EOS blockchain, etc.).

In some variations, the blockchain nodes for a same blockchain network (e.g., managed or unmanaged by the platform) communicate with each other in a peer-to-peer fashion to implement a blockchain network. In some variations, the blockchain nodes for a same blockchain communicate with blockchain client applications (e.g., 171) in a client-server fashion to process blockchain requests.

In some variations, blockchain nodes (e.g., 151, 152) for new types of blockchains can be deployed within the platform 101 by deploying a new blockchain agent (e.g., 142), or re-configuring a deployed blockchain agent to deploy a blockchain node (e.g., 152) for the new type of blockchain. In this manner, blockchain nodes for new types of blockchains can be added to the platform 101 using the existing implementations of the snapshotting system 197, routing components, and agents used by the platform 101.

The system can include one or more node agents (e.g., 141, 142) that function to manage a node. Each blockchain node ("node") is preferably paired with an agent that communicates with the control system (e.g., 189), communicates with the respective gateway, and coordinates node operation (e.g., determines node attributes, starts/stops the node, controls node snapshotting, controls node initialization, etc.). However, the blockchain node can include the agent (e.g., wherein the agent is implemented as part of the blockchain protocol), communicate directly with the platform, or be otherwise constructed. Alternatively, a single agent can manage multiple blockchain nodes, or a single blockchain node can be managed by multiple agents.

The agent preferably executes in the same container instance as the paired node, but can alternatively execute in a different compute instance. The agent can be specific to the blockchain network (and/or blockchain protocol) of the node (e.g., include blockchain-specific functions or queries), be generic across multiple blockchain networks (e.g., be protocol-agnostic), be specific to a blockchain type (e.g., UTXO agent, account-based agent), or be otherwise constructed.

In one example, each agent (e.g., 141, 142) is an application that is run by a compute instance (e.g., a virtual compute instance, a physical compute instance). The machine-executable instructions for an agent can be retrieved from any suitable storage location (e.g., a public repository, such as Github, a public storage location, from a local storage device, from a remote storage device, etc.). In variants, an agent (e.g., 141-142) functions to communicate with the discovery system 198 and the snapshotting system 197. In some implementations, an agent can execute at least one command (e.g., an operating system command, etc.) to deploy a specified blockchain node. By virtue of including agents, blockchain nodes (e.g., 151-152) can be managed by the system 100 without modification to existing blockchain nodes. For example, an agent can implement a node management process that enables a node to be managed by the platform 101, without requiring the node itself to implement node management processes.

In some variations, the agent can: deploy a new blockchain node, start a blockchain node, stop a blockchain node, snapshot a blockchain node (e.g., write to a snapshot repository), restart a blockchain node, initialize blockchain data (chain state) for a blockchain node from a snapshot (e.g., from the data storage system 160), render configuration files for a blockchain node using context provided by the snapshotting system 197, access blockchain node telemetry data or attributes for at least one blockchain node; provide blockchain node telemetry data or attributes (and optionally agent telemetry data) to the snapshotting system 197, monitor health for a blockchain node, function as a blockchain node (e.g., as a full or lightweight node; broadcast transactions; emit blockchain events; etc.), and/or provide node attributes (and optionally agent attributes) to a data storage system (e.g., 160).

In some variations, at least one node included in the cluster is communicatively coupled to at least one respective node agent (e.g., 141, 142, shown in FIG. 1C). In some implementations, each cluster includes one or more compute instances (e.g., 191 shown in FIG. 1C). In some implementations, each compute instance includes a node agent and one or more respective blockchain nodes. However, clusters and compute instances can be implemented in any suitable manner, using any suitable computing resources.

In some implementations, each agent is the same for each node implementation (e.g., Bitcoin, EOS, etc.), and the custom logic for an implementation lies within configuration used by the agent to deploy a blockchain node. Alternatively, each agent can be specific to a blockchain class (e.g., account-based blockchain, UTXO blockchain, etc.), a blockchain protocol (e.g., Bitcoin, EOS, ETH, etc.), or otherwise customized.

In some variations, each agent functions to receive network traffic (e.g., directly or indirectly from one or more client systems 171, 172) and forward the received traffic to the blockchain node managed by the agent.

In some variations, each agent is communicatively coupled to the discovery system 198.

In some variations, an agent provides a current state of the node (or nodes) managed by the agent to the discovery system 198. In some implementations, the discovery system 198 stores received blockchain node state information at the data storage system 160. However, the discovery system can otherwise persist received blockchain node state information. By virtue of each agent providing a current state of the respective node (or nodes) to the discovery system 198, state for an entire cluster of nodes can be accessed (e.g., by the snapshotting system 197). Moreover, by aggregating state for a cluster of nodes in a centralized location, a cluster can be managed by the platform (e.g., by using the snapshotting system 197) without requiring nodes to be aware of state of peer-nodes operating in the cluster.

Furthermore, by virtue of each agent providing a current state of the respective node (or nodes) to the discovery system 198, the system (e.g., the snapshotting system 197) can discover new blockchain nodes or blockchain node clusters that have been added to the platform (e.g., by an agent, an autoscaling group, etc.).

In a first variation, each agent registers with the discovery system 198 when the agent is deployed (e.g., by a cluster manager 190). For example, when deployed, an agent can automatically provide state information to the discovery system 198 at a pre-configured (or dynamically determined) network location. In a second variation, the discovery system 198 discovers new agents when they are deployed. In one example, the discovery system 198 discovers a new agent based on: the data storage system (e.g., persistent storage), wherein the discovery system 198 monitors for new agents reporting their attributes; the compute instance running the agent; a service registry for resources; or otherwise discovered. In a second example, the discovery system 198 discovers a new agent based on new entries within the data storage system 160 (e.g., new IP addresses, new usernames, new DNS name, etc.). However, an agent can be otherwise registered with the discovery system 198 or discovered by the discovery system 198 such that the discovery system maintains state of available blockchain node agents.

An agent can optionally control the compute instance that hosts the agent to synchronize blockchain state for a blockchain node managed by the agent (e.g., as described herein).

In some implementations, each agent (e.g., 141) functions to provide an interface that exposes operational functionality of the blockchain node (e.g., 151) managed by the agent. In some implementations, the agent and the blockchain node run as separate processes in a same compute instance.

In variants, agents are communicatively coupled to the snapshotting system 197 via a respective routing component (e.g., a gateway 121, load balancer 199). In variants, a gateway (e.g., 121) functions to transmit blockchain requests (provided by a client system, e.g., 171) to connected blockchain nodes (e.g., 151, 151), either directly, or indirectly via a respective agent (e.g., 141). In variants, a load balancer (e.g., 199) functions to transmit blockchain requests to connected blockchain nodes (e.g., 151, 151), either directly, or indirectly via a respective agent (e.g., 141).

In variants, the system 100 (e.g., the platform) includes a cluster manager (e.g., 190 shown in FIG. 1A) that functions to add and remove compute instances from a cluster based on one or more of configuration, information received via a user interface, information received via an Application Programming Interface (API), health checks, and/or other information. In some implementations, the cluster manager is an AWS autoscaling group cluster manager that receives configuration and/or instructions via an AWS EC2 console. However, clusters can otherwise be configured and managed.

The system can include at least one routing component that functions to route traffic to different clusters and/or nodes within a cluster.

In some variations, each routing component functions to receive network traffic from a cluster and forward the received traffic to a blockchain node that is communicatively coupled to the routing component. In some implementations, routing components function to receive blockchain requests (e.g., to record a blockchain transaction) from a blockchain client system (e.g., 171), such as, for example, a digital wallet module.

In some variations, blockchain nodes (and corresponding agents) are organized into clusters, and a routing component is placed in front of each cluster. In some variations, each routing component is capable of handling one or more node clusters. In some implementations, multiple clusters can be put behind the same routing component, and requests can be routed to the appropriate cluster based on a host header or a path prefix. By virtue of routing components that function to route requests based on host header or a path prefix, a number of routing components used by the platform can be reduced, as a single load balancer can be used for multiple clusters.

In some implementations, requests (received via the blockchain network) are forwarded to healthy blockchain nodes by using a routing component. In some implementations, request forwarding is performed by performing a reverse proxy process. In some implementations, the routing component forwards the requests to blockchain nodes identified in a routing table used by the routing component. In some implementations, nodes are added or removed from the blockchain network by updating the routing table used by at least one routing component. In some variations, unhealthy nodes are removed from routing tables so that requests are not forwarded to the unhealthy nodes.

In some variations, at least one routing component functions to perform at least one of: load balancing of traffic across nodes in a cluster; rate limiting; authentication; analysis of request; transformation of requests (e.g., rewriting unsafe requests, etc.); and the like.

In some implementations, one or more routing components (collectively or individually) function to enable advanced routing rules for blockchain requests. The routing component can determine routing for incoming blockchain requests based on request processing load of a blockchain node (e.g., 151), compute resources available to the blockchain nodes, or based on any suitable rule or metric. In variants, the routing component can parse a blockchain request and identify a set of one or more blockchain nodes that implement functionality for processing the blockchain request (e.g., matching protocol, protocol version, etc.).

In some variations, a routing component enables the blockchain infrastructure to meet demand. In some variations, a routing component functions to distribute incoming traffic across multiple agents. In some variations, a routing component functions to enable static internet protocol (IP) addresses to be assigned. In some variations, a routing component functions to perform blue/green deploys of blockchain nodes, e.g., two identical production environments where only one environment is live at a time and wherein the blockchain environment switches between one environment and another seamlessly, which often reduces downtime and risk within a network environment.

The system can include one or more routing components. Routing components can include: a gateway 121, a load balancer 199, shown in FIG. 1D, and/or other routing components. Each cluster is preferably associated with a dedicated gateway and load balancer, but can alternatively share gateways and/or load balancers with other clusters.

The gateway 121 preferably: reverse proxies requests to healthy nodes (e.g., acts as a gateway to the cluster), infers node health status from inflight requests and responses, handles load balancing requests, routes requests (e.g., based on cookies, independent of cookies), caches requests and node information (e.g., health attributes), enforces rate limiting to specific nodes and/or the cluster, authorizes and/or authenticates users (e.g., sending the blockchain requests), handles retries, filtering requests and responses (e.g., based on a set of rules or heuristics), injects headers with node statuses, determining (e.g., pull, receive) node attributes, operating according to a set of configurations, and/or performs other functionalities. The gateway is preferably connected to the cluster, but can additionally or alternatively be connected to each individual node within the cluster. The gateway preferably receives requests from one or more clients or users (e.g., via an API), but can receive requests from other endpoints.

In some implementations, the gateway 121 receives configuration from the snapshotting system 197 (e.g., at predetermined intervals, in response to triggering events, etc.). In some variations, snapshotting system 197 keeps the state of each blockchain node (and optionally state of each agent) included in a same cluster in memory (e.g., in the data storage system), and the gateway can be used to manage the cluster state (e.g., node and node agent state) if the snapshotting system 197 fails. For example, if the snapshotting system 197 experiences a failure, a corresponding gateway can continue to use the latest configuration pushed from the failed snapshotting system 197, until the failed snapshotting system 197 is restored.

The load balancer 199 functions to balance the load across the nodes of a cluster, and optionally specifies which node a request should be routed to, determines a rate limit for each node, and/or performs other functionalities. The load balancer is preferably connected between the gateway and the client, but can alternatively be arranged between the gateway and the cluster or be otherwise arranged. Each gateway is preferably paired with a different load balancer, but can alternatively share load balancers. In variants, the platform can optionally include a load balancer that functions to balance gateway updates, agent updates, snapshot jobs, and/or other traffic across the platform's subcomponents.

In variants, the system 100 is implemented by at least one computing system. The system can be implemented by a single computing system, or by a distributed computing system that includes several computing systems. Each computing system can include any combination of virtual compute instances and physical hardware devices (physical compute instances). The system is preferably implemented by a centralized system (e.g., platform, cloud computing system, etc.), but can alternatively be implemented by a distributed computing system or a combination thereof (e.g., a centralized platform including the control system, storage system, and gateways connected to distributed nodes).

In variants, each hardware device (e.g., 400 shown in FIG. 4) can include one or more of a processor (e.g., 403A-N), a display device (e.g., 491), a memory (e.g., 422), a storage device (e.g., 405), an audible output device, an input device (e.g., 481), an output device, and a communication interface (e.g., 411). In some variations, one or more components included in the hardware device are communicatively coupled via a bus (e.g., 401). In some variations, one or more components included in the hardware device are communicatively coupled to an external system via the communication interface 411. Processors (e.g., 403A-N) can include one or more of a CPU (central processing unit), GPU (graphics processing unit), NPU (neural processing unit), and any other suitable processing system that functions to execute machine-readable instructions. The communication interface functions to communicate data between the hardware device and another device via a network (e.g., a private network, a public network, the Internet, and the like).

In some variations, the storage device 405 includes machine-executable instructions for an operating system 430, a hypervisor 431, applications 413, device drivers 414, a blockchain node agent (e.g., 141), and a blockchain node (e.g., 151). In some variations, the storage device 405 includes configuration for a blockchain node 416, and chain state of at least one blockchain node (e.g., 415). In variants, the chain state 415 can be initialized with the chain state of other nodes in the related blockchain network (e.g., 196) by accessing snapshots (e.g., full chain state backups, incremental chain state backups, etc.) of chain states stored in the data storage system 160. These snapshots can be generated by other blockchain nodes that have the same, or similar, configuration as the blockchain node whose chain state 415 is being synchronized. In this manner, the chain state 415 can be initialized by accessing the data stored in the storage system 160, rather than by performing a full synchronization process that accesses full chain state from other nodes in the blockchain network 196.

In some variations, the storage device 405 includes the machine-executable instructions for performing at least a portion of the method 200 described herein. In some variations, at least one component of the system 100 performs at least a portion of the method 200 described herein.

In some variations, the storage device 405 includes the machine-executable instructions for instantiating one or more virtual compute instances that share compute resources of the hardware device.

In variants, at least one hardware device of the system functions to run multiple isolated virtual compute instances. Virtual compute instances can include containers and virtual machines. A hardware device can run containers by using an operating system (e.g., 430) that provides OS(Operating System)-level virtualization that enables each container to share a single OS kernel. A hardware device can run a virtual machine by using a hypervisor (e.g., 431) that hosts a unique guest operating system for each virtual machine. One or more components of the system can run in a same container, a same virtual machine or a same hardware device. Virtual machines can run one or more containers. For example, a single hardware device can run several virtual machines, with each virtual machine running several containers. The system can be implemented in any suitable combination of hardware systems, virtual machines, and containers.

Communication between different components of the system 100 can be performed via a secure communication session, or communication can be unsecured. Communication sessions can be secured using: TLS (Transport Layer Security), certificate validation provided by a certificate authority, other encryption (e.g., using symmetric or asymmetric keys), and/or any other suitable security. The communication can optionally be authenticated, using public key cryptography, tokens (e.g., Oauth tokens), or other authentication methods.

The system 100 preferably manages the nodes for multiple blockchain networks, but can alternatively manage nodes for a single blockchain network. In some variations, at least one component of the system 100 performs blockchain node health checks. In variants, the snapshotting system 197 performs blockchain node health checks. Additionally, or alternatively, an agent (e.g., 141) performs health checks for blockchain nodes managed by the agent. Additionally, or alternatively, a gateway (e.g., 121) performs health checks for one or more blockchain nodes. Alternatively, a health check system performs the health checks.

In one example, the health-checking component can: determine a blockchain network identifier for the respective node being analyzed (e.g., from the node, the agent, the gateway, etc.), retrieve a health check template for the blockchain network identifier, retrieve node attributes (e.g., from the node, from the paired node agent, from centralized storage, and/or from another source), and determine a health status (e.g., perform a health check) based on the node attributes and the retrieved health check template. Examples of the health status include: down, up, restoring, syncing, synced, faulty/high error rate, or any other suitable health status. The health check templates can be for: each blockchain network (e.g., each mainnet, testnet, etc.), each blockchain protocol (e.g., BTC, ETH, etc.), each protocol type (e.g., UTXO, account based, etc.), a generic health check (e.g., wherein adapters convert the protocol specific node attribute values to generic attribute values for generic health checking), and/or any other suitable blockchain network or combination thereof. However, the health checks can be otherwise performed.

In some implementations, rather than simply checking to see if a monitored blockchain node (e.g., 151) is transmitting an "OK" status message, the component performing the health-checks communicates with a respective node agent to access the corresponding node's telemetry data (e.g., block height, latest block hash, total work on a blockchain, etc.) and evaluate the health status of the node by using the accessed telemetry data. By virtue of performing health-checks based on the node's telemetry (as opposed to validating health based on a status message provided by the node), updates to the health-checking processes can be made by modifying such processes at a centralized location, rather than requiring modifications to be made at several agents or nodes.

The snapshotting system 197 functions to manage blockchain node snapshotting. In variants, the snapshotting system 197 can: evaluate blockchain node health (e.g., based on blockchain node telemetry or attributes read from the data storage system 160, from data directly read from the node, from information provided by the discovery system 198, etc.), control the blockchain node operation state (e.g., up, down, restoring, syncing, etc.), control blockchain node initialization (e.g., select a snapshot repository to mount to a new node instance, select incremental snapshots to mount, perform initial health checks, etc.), initiate blockchain node snapshotting (e.g., signaling the agent to gracefully shut down a selected blockchain node, instructing the agent to mount the snapshot repository and take a snapshot of the blockchain node, etc.), scale a blockchain node cluster up or down (e.g., based on current or anticipated load), maintain or remediate the blockchain nodes or blockchain node clusters, track blockchain node-level and blockchain cluster-level metrics, automatically detect addition of new blockchain nodes or agents to a cluster (e.g., in response to new node or agent registration with the data storage system, in response to a notification from the discovery system 198, etc.), track a chain state index for each node (e.g., block height, last block identifier, timestamp, etc.; to determine which chain state increment to snapshot next), and/or perform any other suitable functionality.

In some variations, a snapshotting system 197 is communicatively coupled to each routing component. In some variations, the snapshotting system 197 functions to manage agents (e.g., 141) via at least one routing component. In some variations, the snapshotting system 197 sends control instructions for an agent to the routing component, and the routing component routes the control instructions to the agent. Control instructions can include instructions for at least one of: deploying a new blockchain node, starting a blockchain node, stopping a blockchain node, snapshotting a blockchain node, deploying a new blockchain node agent, stopping a blockchain node agent, and starting an a blockchain node agent.

In some variations, the snapshotting system 197 sends configuration information for an agent to the routing component, and the routing component routes the configuration information to the agent. In some implementations, blockchain node configuration is templatized by maintainers of a blockchain node cluster. In some implementations, dynamic values are rendered into the template by the snapshotting system 197, and the resulting configuration is pushed to an agent and placed on the node cluster's (e.g., 131) file system by the agent. In such implementations, templatization capabilities can lie within the snapshotting system 197, and agents are not required to implement processes for generation of configuration. In some implementations, dynamic values are rendered into the template by the agent. However, configuration for a blockchain node can be generated in any suitable manner.

In some variations, the snapshotting system 197 receives telemetry information (e.g., attributes) for at least one of an agent and a node, and generates health information based on the received telemetry information. The telemetry information can be received via a routing component, received via an agent, accessed from the data storage system 160, or accessed from the discovery system 198. In some implementations, the health information can identify a node state, such as, "down", "up", "restoring", "syncing", "synced", "faulty", "high error rate", etc.

In some implementations, the snapshotting system 197 functions to scale a blockchain node cluster up or down by deploying additional agents (and optionally nodes). In some implementations, the snapshotting system 197 functions to deploy a new blockchain node. In other implementations the snapshotting system 197 functions to deploy a blockchain node agent, and signals the blockchain node agent to deploy the blockchain node.

In some implementations, the snapshotting system 197 functions to maintain a set of healthy nodes, and perform remediating action if the cluster state is degrading. In some implementations, the snapshotting system 197 functions to track node level and cluster level metrics. In some variations, the snapshotting system 197 functions to retrieve data about available nodes from the data storage system (e.g., 160) or the discovery system 198.

In some implementations, a blockchain network (e.g., 196) is a network operated according to a blockchain protocol. In some variations, a blockchain network is a cryptographic currency network (CCN), wherein the blockchain is implemented with a cryptocurrency protocol, such as Bitcoin, Ethereum, or any other cryptocurrency protocol. In some implementations, such cryptocurrency protocols are implemented via the blockchain nodes (e.g., 151, 152), and may include the Bitcoin cryptocurrency protocol as implemented by bitcoind, the Ethereum cryptocurrency protocol as implemented by Geth, or any cryptocurrency protocol implemented in one or more ways. In some variations, the blockchain nodes persist the chain state.

In some variations, the platform 101 functions as a remote server for building and maintaining a blockchain infrastructure.

In some variations, each blockchain node functions to detect, validate, and relay state updates across the blockchain network (e.g., 196), wherein the blockchain states are synched from peer nodes. In some variations, each synced blockchain node maintains a full copy of the blockchain's chain state on a local storage medium (e.g., 405 shown in FIG. 4).

In some variations, the data storage system 160 functions to provide data storage for the blockchain platform, and store the chain state of one or more blockchains. In some variations, the data storage system 160 is a cloud-based data storage system that provides persistent storage. The data storage system 160 can be: block storage, file storage, object storage, and/or any other suitable type of storage. In some variations, the data storage system 160 is an Amazon Elastic Block Store (EBS), which provides persistent block storage volumes for use with EC2 instances in the cloud. In some variations, the data storage system 160 is a cloud-based storage system (e.g., Amazon Simple Storage Service (S3)) that provides public access to authenticated clients via a public interface (e.g., via the Internet). In the latter instance (and/or when object storage is used), the system can optionally include a copy-on-write filesystem (e.g., BTRFS, XFS, Ext4, etc.) that supports taking instance block level snapshots of the filesystem and/or taking incremental snapshots (e.g., from the last snapshot delineation, such as the block height of the last snapshot, the last block of the last snapshot, the timestamp of the last snapshot, etc.).

The data storage system 160 can store: one or more chain state snapshots of the same or different blockchain networks (e.g., of the full chain state, of chain state increments, etc.), node attributes (e.g., node telemetry, blockchain network identifier, etc.), a node registration list, routing maps, and/or other data.

In some variations, the control system 189 includes a discovery system 198. In some implementations, the discovery system 198 functions to receive state information from one or more node agents (e.g., 141). In some implementations, the discovery system 198 stores received state information in a storage system (e.g., 160). In some implementations, the discovery system 198 provides at least a portion of the received state information to the snapshotting system 197. In some implementations, the discovery system 198 pushes state information to the snapshotting system 197 (e.g., by sending a state update notification, etc.), and the snapshotting system can use the state information to identify addition of new nodes to a cluster. Additionally, or alternatively, the snapshotting system 197 can send state requests to the discovery system 198, and the discovery system 198 and provide state information to the snapshotting system as a response to a state request. However, the discovery system 198 can otherwise provide state information for blockchain nodes, agents, and clusters to the snapshotting system 197 in any suitable manner. In variants, the control system 189 can perform one or more processes described herein for the discovery system 198.

System Examples

In variants, the system includes several blockchain node clusters (e.g., 131, 132), at least one for each blockchain network. For example, the system can include a blockchain node cluster for a Bitcoin network, a blockchain node cluster for an Ethereum network, and a blockchain node cluster for an EOS network. For example, in some implementations, the platform 101 can include a second routing component for a second blockchain network that is different from the blockchain network managed by a first routing component (e.g., the gateway 121 shown in FIG. 1D); this second routing component can be coupled to agents managing nodes for the second blockchain network. The second blockchain network can be a network for a different type of blockchain (e.g., EOS instead of Bitcoin), or for a different version of the same type of blockchain (e.g., a blockchain for a test version of the Bitcoin network). However, the platform can otherwise support multiple blockchain protocols.

In variants, each blockchain node (e.g., 151, 152) is an application that is run by a compute instance (e.g., a virtual compute instance, a physical compute instance). Example blockchain nodes include bitcoind (for Bitcoin) and nodeos (for EOS). For example, machine-executable instructions for the blockchain node can be downloaded to a compute instance, and the compute instance can execute the instructions for the blockchain node. The machine-executable instructions for the blockchain node can be retrieved from any suitable storage location (e.g., a public repository, such as Github, a public storage location managed by the blockchain issuer, from a local storage device, from a remote storage device, etc.).

4. Method.

Figure 2:
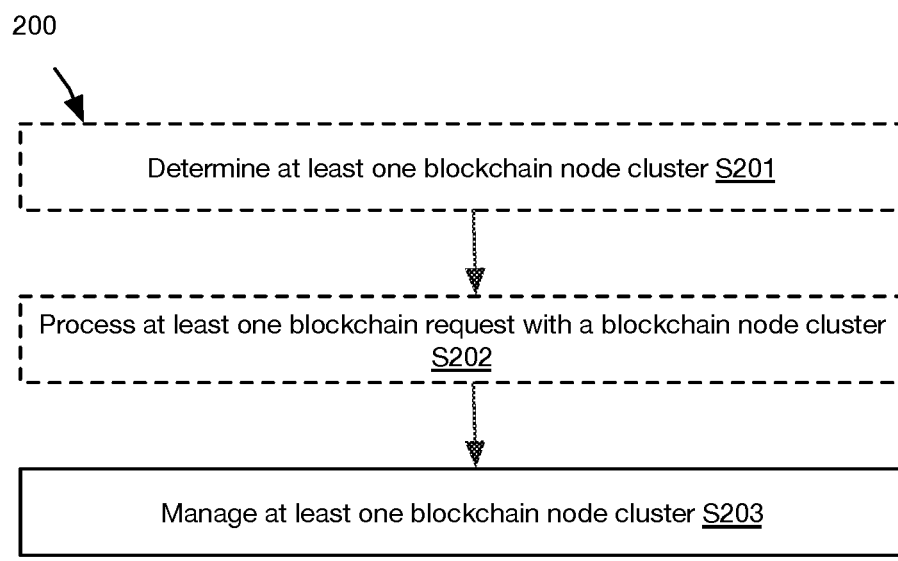
FIG. 2 is a flowchart representation of a method, in accordance with variations.

FIG. 2 is a flowchart representation of a method, in accordance with variations.

The method 200 (example shown in FIG. 2) includes managing at least one blockchain node cluster S203. The method can optionally include one or more of: determining at least one blockchain node cluster S201; and processing at least one blockchain request with a blockchain node cluster S202. In variants, at least one component of the system (e.g., 100) performs at least a portion of method 200.

Figure 3A:
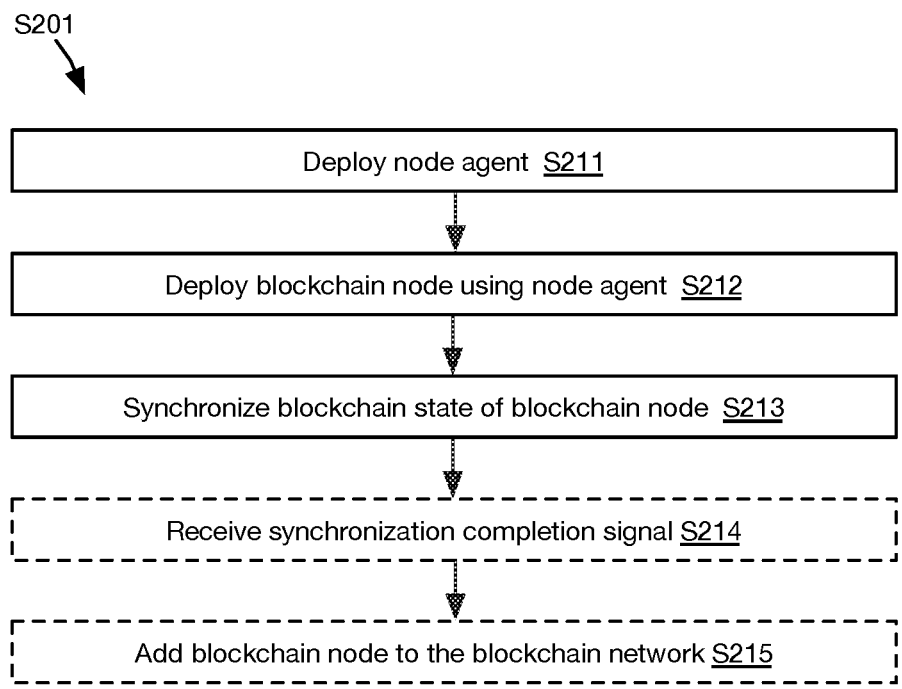
FIG. 3A is a flowchart representation of a cluster creation process, in accordance with variations.
Figure 5:
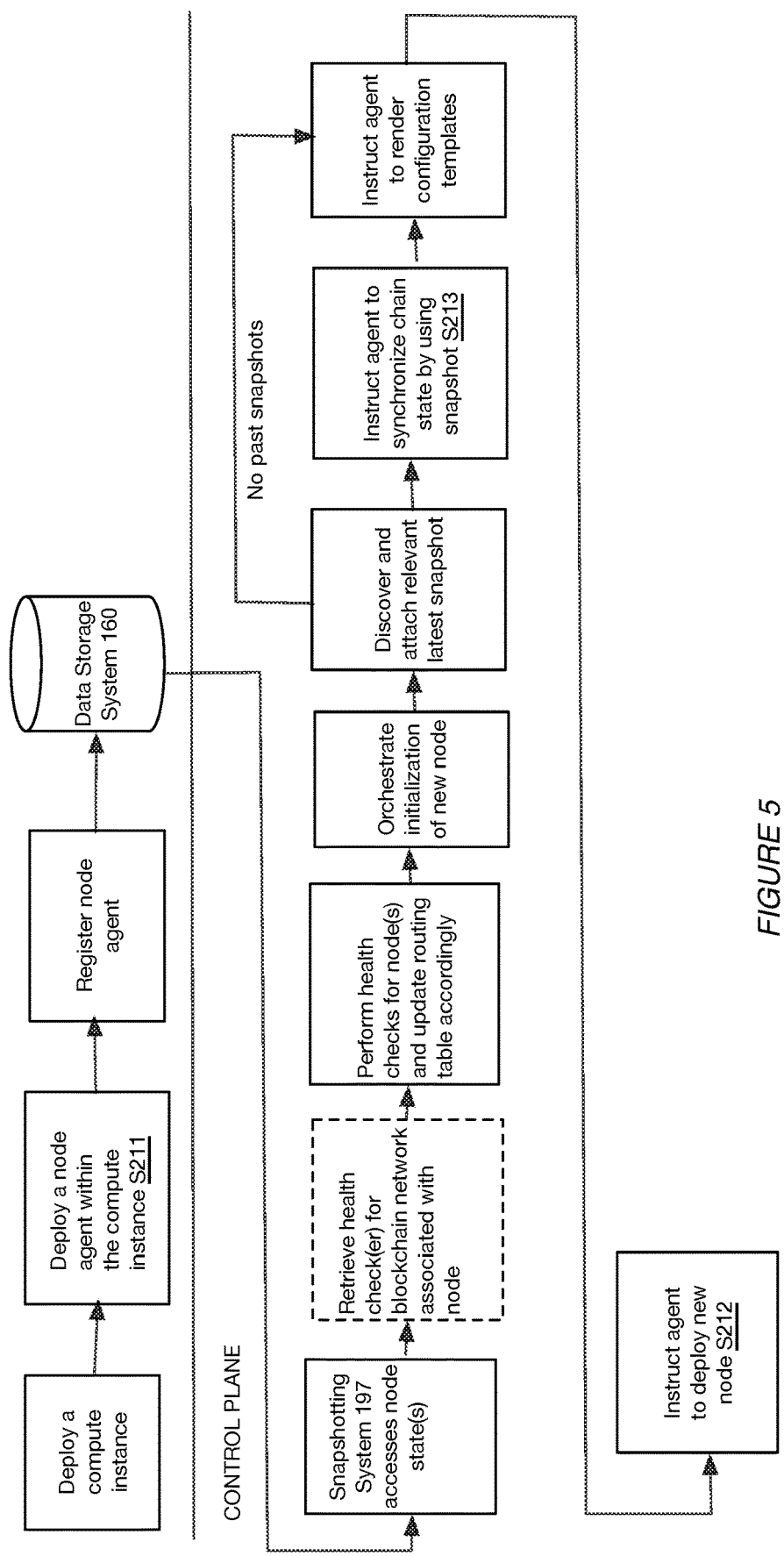
FIG. 5 is a flow diagram for an exemplary process for starting a node, in accordance with variations.

Determining a blockchain node cluster (S201) can include starting a blockchain node included in the blockchain node cluster (e.g., by performing one or more of steps S211 to S215, shown in FIG. 3A). FIG. 5 is a flow diagram for an exemplary process for starting a blockchain node, in accordance with variations.

In some variations, starting a blockchain node includes at least one of: synching the new node (S213); receiving a signal that the synching is complete (S214); and adding the new node to a blockchain network (S215). If the blockchain node is not already deployed, starting the node includes deploying the new node (e.g., 152) (S212). In some variations, an agent deploys the new node. If such an agent is not already deployed, then starting the node includes deploying the agent (e.g., 142) (S211).

In some variations, deploying a new node agent (S211) includes provisioning a new compute instance, and running a new node agent in the provisioned compute instance. Alternatively, a new node agent can be run on an existing compute instance. S211 can be performed by the platform, by an entity associated with the platform, by a third party (e.g., using an agent provided by the platform), and/or by any other suitable system or entity. In variants, the compute instance running the new node agent is included in a blockchain node cluster (e.g., 131). The blockchain node cluster (e.g., 131) can include several blockchain nodes that can collectively process blockchain requests received from one or more client systems (e.g., 171). A routing component can route blockchain requests to individual blockchain nodes within the cluster. A routing table included in a routing component can identify which blockchain nodes belong in a same blockchain node cluster.

In variants, a physical compute instance is manually added to a cluster (e.g., by installing a new hardware server in a data center). In variants, a cluster manager 190 provisions at least one new compute instance (e.g., a virtual compute instance). In some implementations, the cluster manager can provision new compute instances in response to a specific request to add a new compute instance to the cluster. For example, an administrator can explicitly request that a new compute instance be added to the cluster. Additionally, or alternatively, the cluster manager can automatically provision a new compute instance based on a rule or configuration. In an example, configuration for a cluster identifies a minimum number of compute instances, and the cluster manager automatically provisions a new compute instance if a number of healthy compute instances running in the cluster is below the minimum number of compute instances. For example, if a compute instance stops processing blockchain requests for any reason (e.g., a hardware failure, a software failure, a state change, etc.), causing the number of active compute instances running in the cluster to fall below threshold value, then the cluster manager automatically provisions a new compute instance for the cluster. The cluster manager can provision a new compute instance in accordance with configuration information. In an example, configuration (e.g., identified in a template) identifies processes to be executed by the compute instance once the compute instance has been provisioned. In variants, for at least one blockchain cluster (e.g., 131), the cluster manager 160 is configured to provision new compute instances that execute at least one blockchain node agent (e.g., 141). In some implementations, the cluster manager 160 specifies configuration information to be used by the node agent for at least one provisioned compute instance. For example, the cluster manager can provision a new compute instance that automatically executes a script that executes an operating system command that executes a new node agent. In some implementations, the cluster manager 190 is an Amazon Web Services autoscaling manager that manages a collection of EC2 (Elastic Compute Cloud) instances (compute instances) as an autoscaling group (ASG). However, node agents can otherwise be deployed.

Figure 7:
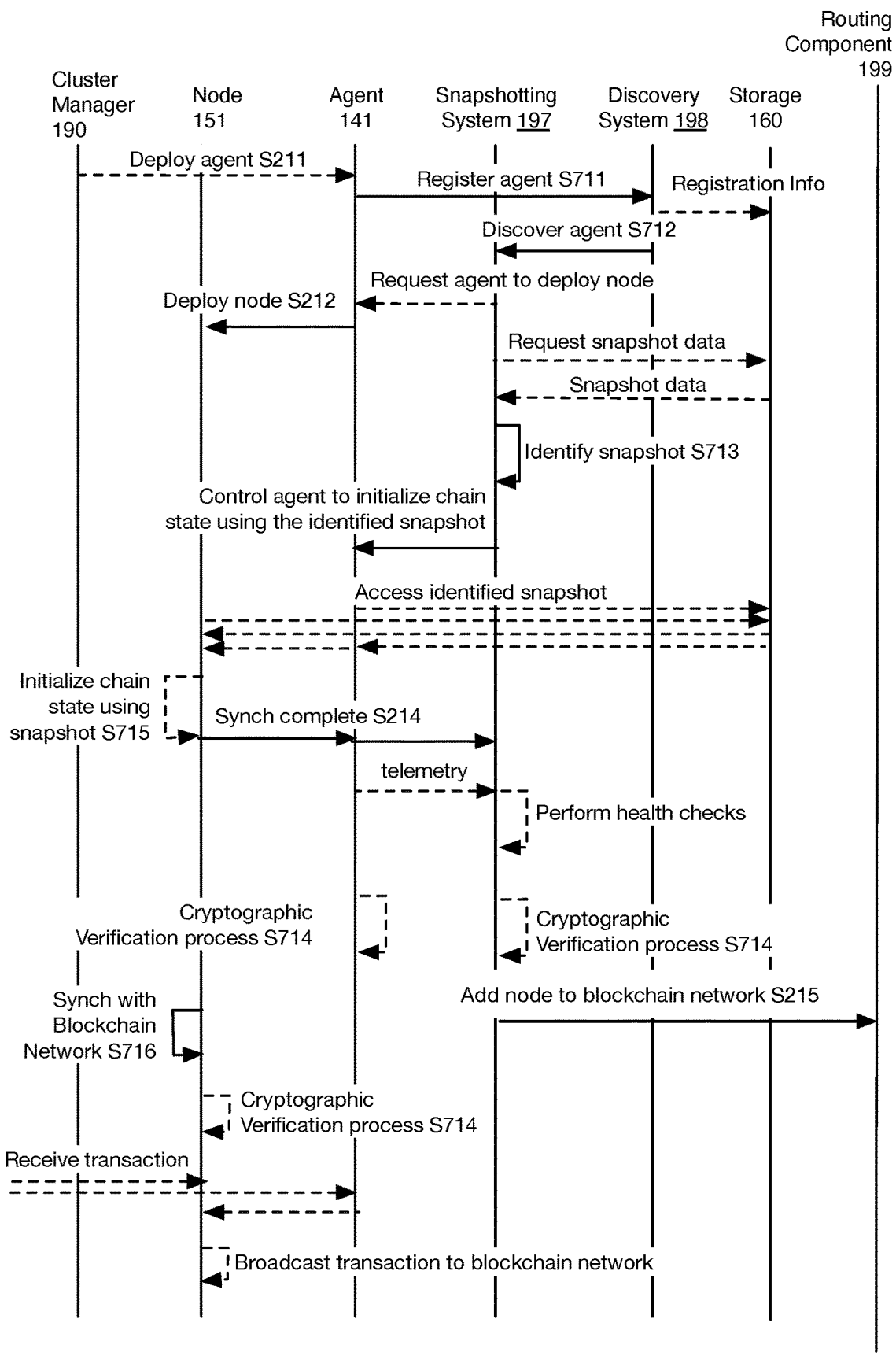
FIG. 7 is a diagram for an exemplary process for adding a node to a blockchain node cluster, in accordance with variations.

In some variations, each deployed node agent provides node agent registration information to the discovery system 198 (e.g., S711 shown in FIG. 7). For example, each node agent can be constructed (e.g., programmed) to locate the discovery system 198, and automatically provide registration information for the node agent to the discovery system 198 via a registration message. In variants, the discovery system 198 stores the registration information at the data storage system 160. In some implementations, node agent registration information includes node attributes, including at least one of: blockchain type (e.g., Bitcoin, EOS, etc.); node agent state (e.g., "uninitialized", "initialized", etc.); a routing component IP address; node IP address; node port; environment; instance ID; snapshot ID; blockchain network (e.g., mainnet, testnet, etc.); specialization; software version; last block height; and/or other attributes.

In some variations, deploying a node agent S211 includes the snapshotting system 197 accessing the node agent registration information from the discovery system 198 (or from the data storage system 160) (e.g., S712 shown in FIG. 7). In some variations, the snapshotting system 197 identifies a blockchain type from the node agent registration information. In some variations, the snapshotting system 197 identifies a routing component from the node agent registration information.

In some variations, the snapshotting system 197 maintains the state of a blockchain node cluster (e.g., 131). In some implementations, the snapshotting system 197 maintains the state of a blockchain node cluster by updating the cluster's state to include information related to the newly deployed node agent. In some variations, the state of a node cluster identifies active routing components, blockchain node agents configured to receive traffic via the node routing components, and information about blockchain nodes managed by the blockchain node agents. In some variations, the state of the node cluster identifies a state of at least one of a routing component (e.g., a gateway, a load balancer, etc.), a node agent, and a node. In some variations, the state of a node cluster identifies a type of blockchain associated with the cluster (e.g., a bitcoin cluster, an EOS cluster, etc.). In some variations, the state of the node cluster identifies health check information to be used to check the health of nodes in the cluster (e.g., by using node telemetry data). In some variations, the state of the node cluster identifies at least one of gateway configuration, load balancer configuration, node agent configuration, and node configuration.

In some variations, deploying a node agent S211 includes the snapshotting system 197 accessing telemetry data from the node agent. In some variations, the snapshotting system 197 accesses telemetry data from each blockchain node agent (e.g., 141), and determines health of each blockchain node agent (e.g., 141) based on the respective telemetry data. In some variations, the snapshotting system 197 accesses the telemetry data via the routing component identified by the node agent registration information. In some variations, the snapshotting system 197 accesses health check information for the identified blockchain type, and determines the health of each blockchain node agent based on the respective telemetry data and the accessed health check information. In some variations, the health check information includes machine-executable instructions (or rules) for determining health for a blockchain node of a specific type based on node telemetry data.

In some variations, deploying the node agent S211 includes the snapshotting system 197 updating a routing table of the routing component to include IP addresses of healthy node agents in the routing table (e.g., to add the node agent to the respective blockchain cluster). In some variations, the snapshotting system 197 updates configuration of the routing component based on the identified type.

In some variations, the snapshotting system 197 instructs a node agent to render configuration templates, and the node agent renders the configuration templates with context information (e.g., data values) provided by the snapshotting system 197.

In some variations, deploying a new blockchain node S212 includes the snapshotting system 197 instructing the deployed node agent to spawn the new blockchain node; in response to the instruction from the snapshotting system 197, the node agent spawns the new blockchain node.

In some implementations, the node agent spawns the new blockchain node (S212) by executing at least one command (e.g., an operating system command, etc.) to run a specified blockchain node. In variants, the agent runs the blockchain node on the same compute instance that runs the agent. Additionally, or alternatively, the agent can run the blockchain node on a different compute instance. In some variations, the node agent access configuration information (e.g., access configuration from a template, dynamically generates configuration, etc.) for the blockchain node, and deploys a blockchain node based on the configuration information. The configuration information used by the agent to deploy the blockchain node can specify a type of blockchain node to deploy (e.g., type of blockchain, version of blockchain, blockchain network identifier, blockchain network type, required parameters, optional parameters, node type, etc.), and the agent deploys a blockchain node that based on the configuration information. In this manner, an agent can deploy any type of blockchain, and the machine-executable instructions of the agent do not need to be modified to deploy a new type of blockchain (as long as suitable configuration is provided).

In a specific example, the agent is compiled from an image into the computing instance, and the agent: receives configuration information (e.g., from a user), retrieves and compiles code for the blockchain node identified by the configuration information (e.g., the binary, the source code, an image, etc.) into the computing instance, configures the compiled node according to the configuration information, registers itself (the agent) with the data storage system (e.g., with the configuration information, such as the blockchain type; with agent information, such as an agent identifier, IP address, credentials, etc.), and optionally sends health attributes (e.g., attributes, telemetry) for the agent and/or node to the data storage system.

Synchronizing the blockchain state S213 functions to load the requisite chain state onto the blockchain node, such that the node can function as a peer in the blockchain network. The requisite chain state can depend on the blockchain network, and can include a partial chain state (e.g., include consecutive blocks from the first block of the network, include consecutive blocks backward from a given block of the network, be missing intermediate blocks, etc.), a full chain state, and/or any other suitable portion of the blockchain.

In some implementations, synchronizing blockchain state of the deployed blockchain node (S213) is performed after node deployment (S213) (e.g., after the agent executes the machine-executable instructions that implement the node). Additionally or alternatively, the blockchain state can be synchronized before and/or after: node detection by the platform, the node passing a health check, node addition to a cluster, and/or any other suitable time.

In a first variation, S213 includes: synchronizing with the blockchain network peers (e.g., downloaded block-by-block and optionally verified); or otherwise synchronized. In some variations, synchronizing blockchain state of the node includes performing a chain state synchronization (e.g., full state synchronization, incremental synchronization, etc.) by communicating with other nodes that are communicatively coupled to the same blockchain network (e.g., 196) (e.g., S610 shown in FIG. 6, S716 shown in FIG. 7). A full synchronization can be performed if no relevant snapshots exist. If a relevant snapshot exists, synchronization can be performed to access blockchain blocks that have been added to the blockchain subsequent to generation of the relevant snapshot.

In a second variation, S213 includes: loading (e.g., copied, read, written, etc.) a snapshot of the chain state for the respective blockchain network onto the computing instance's storage from a stored chain state copy or mounting a volume storing the respective blockchain network's chain state to the computing storage.

The first variant can be used when a snapshot of the blockchain network's chain state (e.g., recorded at a point in time S650 shown in FIG. 6) exists in the data storage system. The snapshot used to initialize the chain state of the node is preferably selected by the snapshotting system 197. Alternatively, the snapshot can be selected by the node agent. However, in some variants, the snapshot can be selected by any suitable component. In variants, the snapshot is selected based on at least one rule. For example, the selected snapshot can be the last snapshot taken for the respective blockchain, the last snapshot of a healthy node, or any other suitable snapshot.

In the first variation, the stored chain state may be incomplete (e.g., missing the most recent blocks), in which case synchronization can optionally be completed by applying the second variant of S213 (e.g., synchronizing with the blockchain network peers), or otherwise completed.

In a first example, the selected snapshot is accessed from a storage medium (e.g., an Amazon EBS volume located in a same availability zone as the compute instance that will be running the blockchain node) that can be mounted to a file system of the compute instance that runs the agent. In a second example, the selected snapshot is accessed (e.g., downloaded) from cloud storage (e.g., an Amazon S3 bucket). In some implementations, the snapshot is downloaded from the cloud storage system and stored in a storage medium accessible by a file system used by the blockchain node. However, snapshots can be accessed from any suitable storage device or location.

In some variations, "Snapshotting" a node (e.g., 151) refers to backing up data (e.g., chain state 415 shown in FIG. 4) from a storage medium (e.g., 405) used by the node (e.g., 151), by taking point-in-time backups. Such backups can include full backups and incremental backups. Incremental backups include backing up data that has been newly added to the chain state 415 since the last backup ("snapshot"). Data can be added to chain state after a full backup as a result of processing blockchain requests (e.g., at S202), as a result of synchronizing chain state with other blockchain nodes that are communicatively coupled to the same blockchain network, by mounting incremental backups captured by other blockchain nodes, or otherwise added. A full backup includes backing up the entire chain state 415. In some implementations, when deleting an incremental backup, only the data unique to that incremental backup is removed, not the full chain state data.

In some variations, synchronizing using a snapshot includes: the snapshotting system 197 identifying at least one snapshot to be used to initialize chain state (S713 shown in FIG. 7). In some variations, the snapshotting system 197 identifies the most recent chain state snapshot related to the type of node being deployed (if such a snapshot exists). For example, the snapshotting system 197 can identify the snapshot associated with: the largest block height, the most recent timestamp, the highest block index (e.g., if sequential blocks increment a block index), and/or any other suitable metric. However, the snapshotting system 197 can identify a snapshot based on any suitable rule.

In some implementations, a snapshot includes a full chain state backup and/or one or more incremental chain state backups generated by using a same blockchain node. For example, a snapshot for chain state for a particular blockchain configuration (e.g., implementation and version) for time $T_2$ can include a full chain state backup created at time $T_1$ (that includes chain state for the time period beginning at time $T_0$ and ending at time $T_1$), in addition to an incremental chain state backup (that includes chain state for the time period beginning at time $T_1$ and ending at time $T_2$). In a specific example, a snapshot can be created during node initialization. For example, a node can load a full state backup (e.g., from $t_0$ to $t_1$, block height $(bh)_0$ to $bh_1$, etc.), load subsequently recorded incremental state backups (e.g., from $t_1$ to $t_2$, $t_2$ to $t_n$, etc.; $bh_1$ to $bh_n$, etc.), and snapshot the resultant loaded chain state as a second full state backup (e.g., encompassing $t_0$ to $t_n$, $bh_1$ to $bh_n$, etc.). The full state backup and the incremental state backups are preferably sampled from the same node, but can alternatively be sampled across different nodes. In a second example, a snapshot can be synthetically generated by combining the chain state backups for a given node. However, the chain state backup can be otherwise created.

In some variations, if such a snapshot exists, the snapshotting system 197 instructs the node agent (e.g., 141) to access the identified snapshot (e.g., S715 shown in FIG. 7). In a first variation, the blockchain node agent mounts a storage medium (e.g., 417 shown in FIG. 4) that stores the identified snapshot (e.g., an Amazon EBS volume located in a same availability zone as the compute instance that will be running the blockchain node) to a file system (of the compute instance that runs the node agent). In some implementations, mounting a storage medium to a file system enables the file system to directly access data stored on the storage medium, without copying the data from the storage medium to a data storage location that is already accessible by the file system. In some implementations, the agent mounts the storage medium by executing an operating system command of an operating system (e.g., 430) executed by the compute instance that executes the machine-executable instructions of the agent.

In a second variation, the node agent access (e.g., downloads, receives via a push operation, etc.) the identified snapshot from a cloud storage system (e.g., an Amazon S3 bucket), and initializes the chain state 415 of the blockchain node by storing the identified snapshot at a storage medium (e.g., 405) used by the node to store the chain state 415. In some implementations, accessing the snapshot from a cloud storage system includes copying the snapshot from a storage location of the cloud storage to a storage location accessible by a file system used by the node agent. However, snapshots can be accessed from any suitable storage device or location.

In some implementations, after using the identified snapshot to initialize the blockchain node's chain state 415 (e.g., at S715 shown in FIG. 7), the blockchain node synchronizes its chain state 415 with other nodes that are communicatively coupled to the same blockchain network (e.g., at S716 shown in FIG. 7). In this manner, the blockchain node accesses blockchain blocks have been added to the blockchain subsequent to the time at which the identified snapshot was generated. For example, if at time $T_3$ the blockchain node's chain state is initialized by using a snapshot generated at time $T_2$ (which is earlier than the time $T_3$), then the blockchain synchronizes it's chain state with other nodes in the same blockchain network to acquire blocks that have been added to the blockchain after time $T_2$. In variants, after the blockchain node has completed synchronization with the blockchain network, chain state synchronization for the blockchain node is complete.

In some variations, synchronizing blockchain state of the node includes performing a cryptographic verification process (e.g., 714 shown in FIG. 7). In a first variation, the cryptographic verification processes are performed for an accessed snapshot, before the snapshot is used to initialize chain state for the blockchain node (e.g., at S213) (e.g., by the platform). In a second variation, the cryptographic verification processes are performed after the snapshot is used to initialize the chain state for the blockchain node (e.g., at S213) (e.g., wherein the node verifies the chain state). In a third variation, a cryptographic verification process is not performed on the snapshotted chain state. In a fourth variation, a cryptographic verification process is performed by the node (e.g., during blockchain network synchronization) before snapshotting.

In some implementations, the cryptographic verification processes are performed for all of the blocks included in the snapshot. For a snapshot represented as a single full backup, a cryptographic verification process can be performed for all blocks included in the full backup. For a snapshot represented as a full backup and one or more incremental backups, cryptographic verification process can be performed for all blocks included in the most recent backup first, and the cryptographic verification process can be performed for other backups representing the snapshot in response to a trigger (e.g., upon lapse of a predetermined amount of time, after the first backup has been verified, in response to a blockchain request that requires access to a block included in another backup of the snapshot, etc.). In variants, the synchronization can be deemed complete (e.g., at S214) after the first incremental backup has been cryptographically verified, and the chain state has been synchronized with the blockchain network to acquire blocks added to the blockchain subsequent to the time associated with the verified incremental backup. In this manner, a blockchain node can be added to the blockchain network (e.g., at S215) before every block in the snapshot has been cryptographically verified, as long as all blocks included in the most recent backup (used to initialize the node's chain state) have been cryptographically verified. In this manner, time to bring a new blockchain node on-line can be reduced (as compared with performing cryptographic verification of every block included in the full chain state).

In some implementations, cryptographic verification processes include processes that verify that recording of the block in the blockchain state complies with the requirement of the corresponding blockchain protocol (e.g., recording of the block does not result in double spending, etc.). However, any suitable cryptographic verification process can be performed to verify that the synchronized blockchain state is valid and suitable for use by a blockchain node that processes blockchain requests for the blockchain network. In some variations, the node agent (e.g., 141) performs the cryptographic verification process S714. Additionally, or alternatively, the snapshotting system 197 performs the cryptographic verification process S714. However, any suitable component of the system 100 can perform the cryptographic verification process S714.

In some variations, the snapshotting system 197 receives a synchronization completion signal (e.g., from the node agent, from the node, either directly or indirectly via another component of the system 100), after the node's chain state has been synchronized with the blockchain network (S214) (and optionally validated at S714). The synchronization completion signal informs the snapshotting system 197 that a new node has been deployed and synchronized, and optionally, identifies an IP address for the node (and/or an IP address of the node agent). In some variations, responsive to the synchronization completion signal, the snapshotting system 197 updates a routing table of a routing component that forwards blockchain requests to the node (e.g., a gateway 121, a load balancer 199) to include the IP address of the synchronized node (or an IP address of the node agent of the synchronized node) in the routing table of the component (S215). In some variations, the snapshotting system 197 can add the synchronized node to the blockchain network in any suitable manner. Once a blockchain node (e.g., 151-152) has been added to the blockchain network (S215), it is ready to receive requests from client systems (e.g., 171) via the routing component.

Processing at least one blockchain request with a blockchain node cluster S202 can include receiving a blockchain request. In variants, a routing component for the cluster receives the request (e.g., from a client system 171, 172) and forwards the request to a blockchain node (or blockchain node agent) included in the cluster. Additionally, or alternatively, a blockchain node (or blockchain node agent) included in the cluster can receive a blockchain request directly from a client system (e.g., 171, 172). Processing the blockchain request can include a blockchain node (included in the cluster) processing the request.

In a first example, the blockchain request is a request to record a blockchain transaction on the blockchain, and processing the request includes recording the blockchain transaction identified by the blockchain request to a blockchain managed by the blockchain node. For example, the blockchain node can add the transaction to a block, and validate the block. In a first variation, the blockchain node records the validated block on the blockchain. In a second variation, the blockchain node broadcasts the validated block to the blockchain network (e.g., 196), and the validated block is added to the blockchain of the blockchain network in accordance with a respective blockchain protocol. In some implementations, the blockchain node adds the validated block to the blockchain by updating the chain state (e.g., 415) stored by the blockchain node (e.g., on the storage medium 405) to include the validated block; the node's chain state can then be synchronized with other blockchain nodes participating in the same blockchain network (e.g., 196). However, a blockchain transaction can be otherwise broadcast to the blockchain network(s) using the nodes.

In a second example, the blockchain request is a request to access information recorded on the blockchain, and processing the request includes the blockchain node accessing information recorded on the blockchain managed by the blockchain node. In some implementations, the blockchain node accesses the information from the chain state (e.g., 415) stored by the blockchain node (e.g., on the storage medium 405). However, blockchain requests can otherwise be processed.

Managing the blockchain node cluster (S203) can include snapshotting the chain state of a given blockchain network. The snapshot can be associated with: a given node instance (e.g., a series of snapshots for each node), a given node configuration or blockchain network (e.g., a series of snapshots for each node configuration or blockchain network, collectively generated from one or more nodes), a given cluster (e.g., a series of snapshots for each cluster, collectively generated from one or more nodes), and/or otherwise configured. Snapshotting the chain state of the blockchain network can include: selecting a blockchain node to snapshot, stopping the blockchain node included in the blockchain node cluster (e.g., 231-235, shown in FIG. 3B), snapshotting the chain state (e.g., an incremental snapshot or full snapshot), and optionally restarting the blockchain node. All or portions of this process can be performed by the central system 189 or component thereof, the agent, the node, the node's file system, and/or another component. However, the node can be otherwise managed.

In some variations, stopping a blockchain node includes at least one of: selecting a blockchain node to stop (S231); removing the node from the network (S232); sending a terminating signal to a node agent for the node (S233); sending a terminating signal to the node (S234); and receiving a signal that termination is complete (S235). The selected node can be: a healthy node, a node with the largest block height (e.g., confirmed blocks), and/or any other suitable node.

In some variations, the snapshotting system 197 selects the blockchain node (e.g., 151-152) to stop at S231. In some variations, the snapshotting system 197 performs intelligent selection of a node to be stopped, based on state of the nodes in a node cluster and/or based on health information obtained by the snapshotting system 197 (e.g., from the discovery system 198, directly from an agent, etc.). In some implementations, the snapshotting system 197 selects a node to stop based on health information determined by telemetry data received from node agents (either directly, or via the discovery system 198). In some implementations, the snapshotting system 197 stops unhealthy nodes (and/or node agents).

In some implementations, the snapshotting system 197 selects a node to be snapshotted (e.g., healthy nodes, nodes with the most up-to-date verified blocks, etc.), and stops the node that is selected to be snapshotted. In some implementations, the snapshotting system 197 randomly selects a node to be snapshotted. In some implementations, the snapshotting system 197 selects a node to be snapshotted based on accessed node data (e.g., block height of nodes in the cluster, block height of nodes outside of the platform 101, etc.). A node for a given blockchain network can be selected for snapshotting (and/or the chain state of a node can be snapshot): at the block generation frequency, at a multiple of the block generation frequency (e.g., 2× the block generation frequency), at a predetermined frequency (e.g., 10 s), randomly, after a threshold time difference amount, or at any other suitable frequency.

In some variations, selecting a blockchain node to stop includes identifying a blockchain node that is to be snapshotted (S231), and stopping the identified blockchain node. In some variations, identifying a blockchain node that is to be snapshotted includes: identifying a node configuration to snapshot, and identifying a healthy blockchain node having the identified node configuration. In variants, a component of the system 100 (e.g., an agent, the snapshotting system 197) determines the health of blockchain nodes based on telemetry data provided by the blockchain nodes.

In some variations, removing the blockchain node from the network (S232) includes the snapshotting system 197 updating a routing table of the routing component (e.g., gateway, load balancer, etc.) to remove an IP address of the blockchain node being stopped, to change the node state (e.g., to "paused" or "stopped"), and/or modifying the node's information in the routing table. By removing the node's IP address from the routing table and/or changing the node state, the routing component will no longer send traffic to the node.

Sending a termination signal (S233) can include the snapshotting system 197 sending a termination signal (instruction) to a node agent (e.g., 141). In some variations, in response to receiving a termination signal from the snapshotting system 197, the agent sends a termination signal (e.g., by executing an operating system command to stop the process running the blockchain node, etc.) to the blockchain node managed by the node agent (S234). In some variations, the snapshotting system 197 receives a termination completion signal from at least one of the node and the node agent, either directly, or indirectly (e.g., via the discovery system 198) (S235). In some variations, the termination completion signal is sent after the node has completed processing all requests that have been forwarded to the node.

Figure 3B:
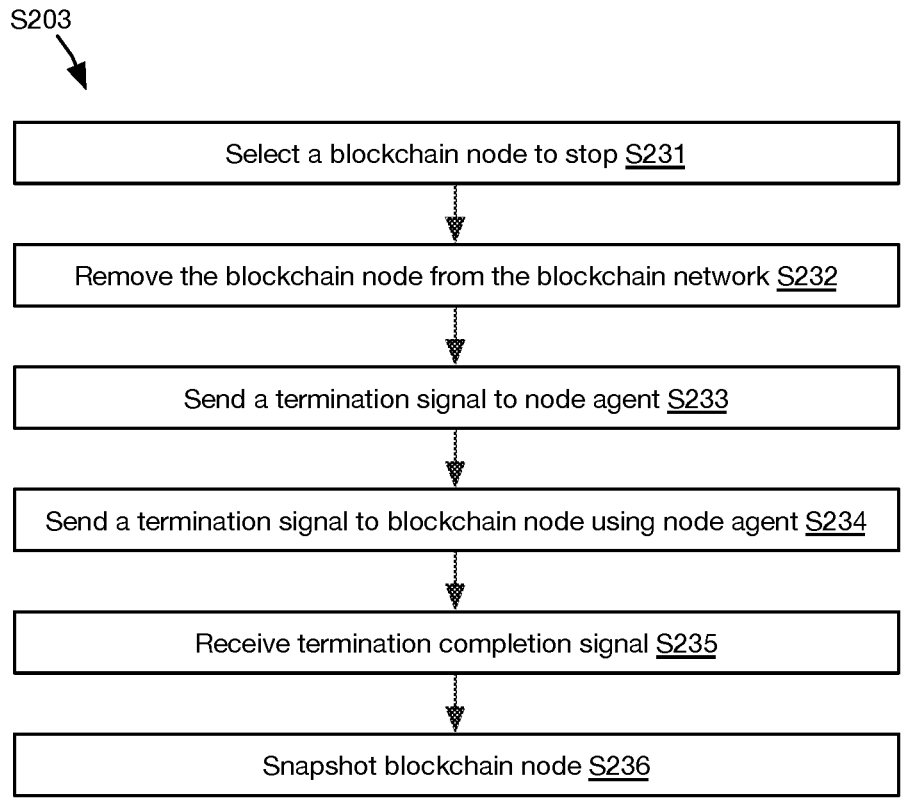
FIG. 3B is a flowchart representation of a cluster management process, in accordance with variations.
Figure 3C:
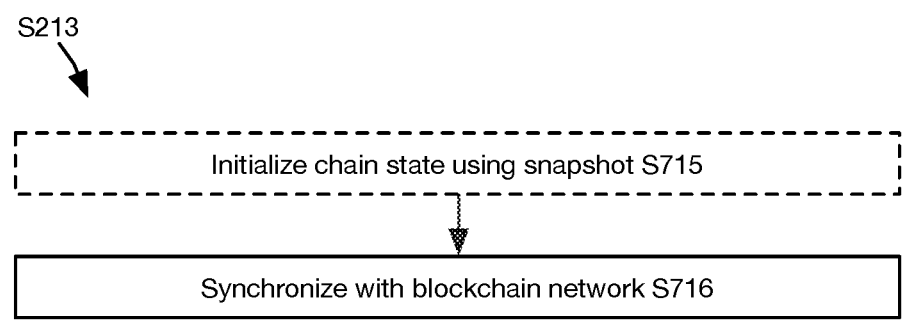
FIG. 3C is a flowchart representation of a synchronization process, in accordance with variations.
Figure 8:
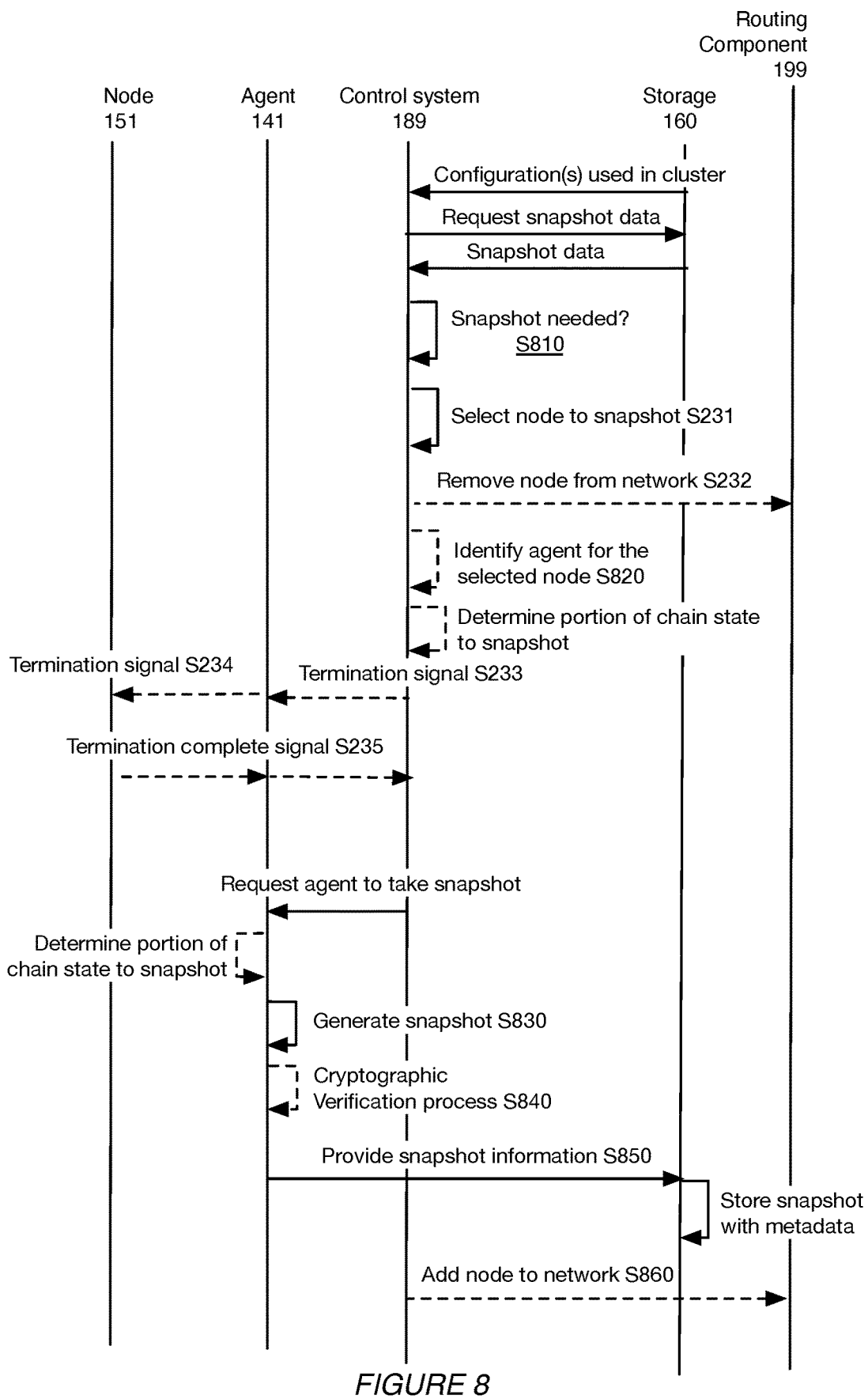
FIG. 8 is a diagram for an exemplary process for generating a snapshot, in accordance with variations.

In variants, managing the blockchain node cluster (S203) includes snapshotting a blockchain node included in the blockchain node cluster (e.g., S236, shown in FIG. 3B, as shown in FIG. 8). In some variations, snapshotting a blockchain node includes snapshotting a blockchain node that has been selected for snapshotting (at S231).

In variants, a component of the system 100 (e.g., the snapshotting system) determines whether a new snapshot is needed (e.g., at S810 shown in FIG. 8). The snapshotting system can determine whether a new snapshot is needed based on rules, configurations, instructions, or any suitable information. In some variations, the snapshotting system 197 accesses information (e.g., metadata) for existing snapshots (e.g. stored by the data storage system 160), and uses the accessed information to determine if a new snapshot needs to be generated for one or more blockchain node configurations (e.g., blockchain node implementation and version).

In variants, determining whether a new snapshot is needed (S810) includes identifying a node configuration to snapshot.

In a first example, the snapshotting system determines whether a snapshot exists for each node configuration used in an active blockchain node cluster (e.g., 131, 132), such that the snapshot can be used to restore a failed blockchain node, or deploy a new blockchain node for the cluster. If a snapshot does not exist for a node configuration used in an active blockchain cluster, then the snapshotting system 197 initiates generation of the snapshot (e.g., by selecting a node agent that manages a healthy blockchain node having the required configuration and instructing the agent to generate the snapshot).

In a second example, the snapshotting system determines whether the difference in time between a timestamp of the most recent snapshot for a node configuration and a current time exceeds a threshold time difference amount, and if so, generates a new snapshot for the node configuration. The threshold time difference amount can be preconfigured, dynamically determined, or otherwise determined or accessed. In some implementations, the snapshotting system 197 selects a threshold time difference amount that satisfies startup time parameters for the blockchain node configuration. A lower threshold time difference amount can be selected to reduce the amount of time required to sync a newly deployed blockchain node with the blockchain network to access blocks that have been added to the blockchain since the most recent snapshot was generated. Threshold time difference amounts can be configured for each of a plurality of blockchain network protocols. For example, a lower threshold time difference amount can be configured for blockchain network protocols that typically process transitions at a higher rate (e.g., EOS), whereas a higher threshold time difference amount can be configured for blockchain network protocols that process transactions at a lower rate. The threshold time difference amount for a blockchain network can be configured to satisfy startup time parameters for the blockchain network protocol. However, threshold time difference amounts can otherwise be configured.

In a third example, the snapshotting system determines whether an additional full backup should be generated for a node configuration, and if so, generates a new full-backup snapshot for the node configuration. For example, to reduce the amount of incremental backups that need to be accessed to initialized chain state for a blockchain node configuration, the snapshotting system 197 can control a blockchain node that has recently initialized chain state by using a full backup and one or more incremental backups to upload a new full backup that includes the backups used to initialized the node's chain state (e.g., at S660 shown in FIG. 6).

However, the snapshotting system 197 can control node agents to generate any suitable type of backup (e.g., a full backup, an incremental backup) for one or more node configurations, such that the system (e.g., 160) stores healthy chain state snapshots that satisfy operational performance and other requirements for one or more blockchain node clusters (e.g., 131, 132). By ensuring that suitable snapshots are available to deploy new blockchain nodes, the snapshotting system 197 can reduce time required to add a new blockchain node to a cluster, and ensure that the newly deployed node has chain state that satisfies accuracy and performance requirements for processing blockchain requests.

In a first variation, the blockchain node is stopped (at S234) before being snapshotted. The blockchain node can be stopped at any suitable time (e.g., stopped in advance of a snapshot request and placed in a standby mode, stopped in connection with a snapshotting operation, etc.). In a second variation, snapshotting of the node can be performed without stopping the node. In some implementations, snapshotting the selected blockchain node includes sending a signal (instruction) to generate a snapshot of the node. In some variations, the snapshotting system 197 sends the signal to generate a snapshot after the node has been removed from the blockchain network (at S232), and after receiving a termination completion signal for the node (at S235).

In some variations, the snapshotting system 197 identifies the node agent for the selected node (e.g., S820 shown in FIG. 8). In some variations, the snapshotting system 197 sends the signal to generate a snapshot directly to the node agent managing the selected node. In some variations, the snapshotting system 197 sends the signal to generate a snapshot to a routing component (e.g., a gateway, a load balancer, etc.) that forwards traffic to the node agent managing the node, and the routing component forwards the signal to the node agent. In some implementations, the node agent (e.g., 141) performs the snapshotting (e.g., S830 shown in FIG. 8) responsive to the signal provided by the snapshotting system 197.

In some variations, snapshotting includes generating a backup (e.g., full backup, incremental backup, etc.) of the node's chain state (e.g., 415 shown in FIG. 4), and storing the generated backup (e.g., in a cloud storage system, in a data volume can be mounted to a file system, etc.).

In a first implementation, generating a backup of the node's chain state includes generating a copy of the blockchain blocks (included in the node's chain state) that have been cryptographically verified by the node. In a second implementation, generating a backup of the node's chain state includes generating a copy of all blockchain blocks (included in the node's chain state), regardless of whether they have been cryptographically verified by the node. In this second implementation, the blockchain blocks included in the backup can optionally be cryptographically verified after the backup is generated.

Figure 6:
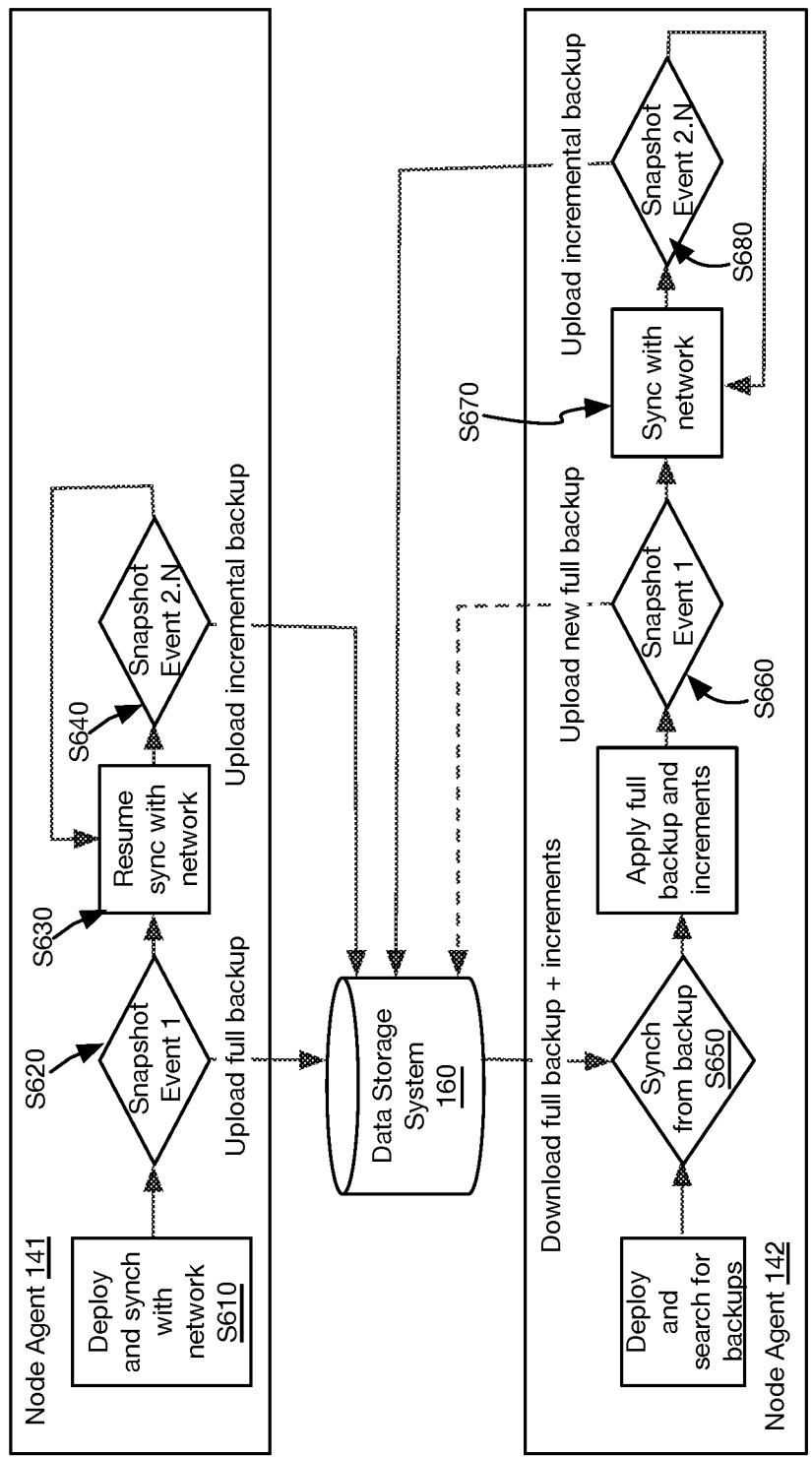
FIG. 6 is a flow diagram for an exemplary process for generating snapshots using node agents, in accordance with variations.

In some variations, backing up the node's chain state (e.g., 415) includes generating a full backup (e.g., S620 shown in FIG. 6). In some variations, backing up the node's chain state includes generating an incremental backup (e.g., S640).

In variants, generating an incremental backup includes identifying the latest snapshot block recorded in the most recent snapshot (e.g., for the node, for the blockchain network), identifying the latest chain state block recorded in the node's active chain state (e.g., 415), and copying blocks of the chain state (e.g., 415) starting with the block after latest snapshot block, up to and including the latest chain state block. In some implementations, identifying the latest chain state block includes identifying the latest chain state block recorded before initiation of the snapshotting process. In some implementations, identifying the latest chain state block includes identifying the latest chain state block that has been cryptographically verified by the node. However, the latest chain state block can otherwise be identified.

In variants, generating an incremental backup includes accessing a most recent previous full backup of the node's chain state (or blockchain network's chain state), generating a current full backup of the node's chain state, determining a delta between the current full backup and the most recent previous full backup, and storing the delta as the incremental backup. In some implementations, a first file system command (e.g., "btrfs subvolume snapshot -r/btrfs/chain_state_data/btrfs/full_backup-1") is used to generate the most recent previous full backup, a second file system command (e.g., "btrfs subvolume snapshot -r /btrfs/chain_state_data/btrfs/full_backup-2") is used to generate the current full backup, and a third file system command (e.g., "btrfs send/btrfs/full_backup-1/btrfs/full_backup-2|gzip>/storage/incremental-backup_2.gz") is used to store the delta between the current full backup and the previous full backup. However, incremental backups can otherwise be generated.

In variants, a component of the system (e.g., the agent, the snapshotting system 197) determines whether to generate a full backup or an incremental backup, based on one or more rules, triggers, parameters, configuration values, and/or any other suitable parameters.

In a first example, a full backup is generated if a relevant full backup does not exist (e.g., for the particular node configuration of the node being snapshotted). As shown in FIG. 6, at S620, there is no full backup for the node configuration used by the node agent 141, and so at S620, the node agent 141 generates a full backup at S620.

In a second example, a full backup is generated to create a single backup that includes the chain state included in a previously generated full backup and all chain states in one or more subsequent incremental backups generated by the same node agent. This can be done by: loading the full backup and incremental backups into a new node, and snapshotting the consolidated chain state of the new node; by aggregating the full backup and incremental backups (e.g., sequentially), or otherwise performed. As shown in FIG. 6, node agents 141 and 142 are part of a same node cluster, and use a same node configuration (e.g., blockchain node implementation and version). At S650, the node agent 142 initializes chain state (of a node managed by the agent 142) by using a full backup (generated at S620) by the node agent 141 and at least one incremental backup (generated at S640) by the node agent 141. At S660, the node agent 142 generates full backup that includes the chain state included in the full backup and each incremental backup used by the agent 141 to initialize chain state at S650. In some implementations, the backups used at S650 can be deleted from the data storage system 160, and replaced with the full backup generated at S660.

In a third example, an incremental backup can be generated if a relevant full backup already exists (and/or other incremental backups for the blockchain network and/or the node instance exist), and can be combined with the incremental backup to initialize full chain state for the node configuration. For example, at S620 the agent 141 generates a full backup, at S630 the blockchain node 151's chain state is synchronized with the blockchain network (resulting in additional blocks being added to the node's chain state), and at S640 the agent 141 generates an incremental backup that can be combined with the full backup generated at S620 to provide full chain state for the point in time at which the incremental backup is taken. This combination of the full backup and the incremental backup includes all blocks accessed from the blockchain network at S610 and all blocks accessed from the blockchain network at S630. Similarly, at S660 the agent 142 generates a full backup, at S670 the blockchain node 152's chain state is synchronized with the blockchain network (resulting in additional blocks being added to the node's chain state), and at S680 the agent 142 generates an incremental backup that can be combined with the full backup generated at S660 to provide full chain state for the point in time at which the incremental backup is taken (at S680). This combination of the full backup and the incremental backup generated by the agent 142 includes all blocks accessed from the snapshot at S650 and all blocks accessed from the blockchain network at S670.

In variants, a determination as to whether to perform a full or incremental backup can be made in any suitable manner.

In variants, each backup is stored in association with metadata (e.g., tagged with metadata, stored in a directory structure or URL that identifies the metadata, etc.). Metadata can include one or more of: an identifier for the node that generated the chain state stored in the backup; a blockchain implementation (protocol) associated with the chain state; a network type associated with the chain state (e.g., mainnet); a specialization associated with the chain state (e.g., pruned, etc.); an implementation version (protocol version) associated with the chain state; a snapshot identifier for the backup; a time stamp; and a mountpoint associated with the chain state (e.g., a mountpoint of the file system included in the operating system that runs the node, etc.). However, any suitable metadata can be stored in association with a backup, in any suitable manner.

In variants, full and incremental backups are stored at a cloud storage system (e.g., Amazon S3). However, backups can be stored in any suitable storage location, such that they can be accessed for restoring chain state of a blockchain node.

In a first variation, an operating system (e.g., 430 shown in FIG. 4) of the compute instance that runs the node agent generates the incremental backup (e.g., at S640, S680 shown in FIG. 6) of the node's chain state (e.g., 415). In the first variation, the agent executes an operating system command to control the operating system to generate the incremental backup of the node's chain state. In some implementations of this variation, the node's chain state is accessible by a file system of the compute instance that runs the node agent, and the file system generates the incremental backup. In some implementations, the file system is a BTRFS (B-Tree File System). However, the file system can be any suitable type of file system that can generate incremental backups. In some implementations, the node agent stores the incremental backups generated by the operating system in a cloud storage system (e.g., 160) (e.g., Amazon S3). However, backups can be stored in any suitable storage location, such that they can be accessed for restoring chain state of a blockchain node.

In a second variation, a process that manages storage of the node's chain state generates the incremental backup of the node's chain state. In variants, the process that manages storage of the node's chain state is separate from the agent and node processes. In variants, the process that manages the storage of the node's chain runs on a same compute instance as the node or agent. However, in other variants, the process that manages the storage can run on a compute instance different from the compute instance that runs the blockchain node and agent. In some implementations of this variation, the node's chain state is stored in an Amazon EBS volume (e.g., 417 shown in FIG. 4) and an EBS storage process that mange's the EBS volume generates incremental backups (e.g., in response to an instruction received via the cluster manager 190, etc.). For example, the agent (or the snapshotting system 197) can request that an incremental backup be generated for an EBS volume by calling an EC2 API provided by the cluster manager 190. Additionally, or alternatively, incremental backups can be automatically generated. However, incremental backups can otherwise be generated.

In variants, the backups of the blockchain node's chain state (e.g., 415) are stored at the data storage system 160 (e.g., at S850). In some variations, cryptographic verification processes are performed for all of the blocks included in a backup before storing the backup at the data storage system 160 (e.g., at S840). However, cryptographic verification of blocks included in a backup can be performed at any suitable time (e.g. before storing, after storing, before being used to initialize chain state, in response to a command, in response to a trigger, etc.). By virtue of performing cryptographic verification for a backup before initializing a node's chain state by using the backup, synchronization time can be reduced. For example, it can oftentimes take days to perform cryptographic verification. By performing cryptographic verification asynchronously with respect to node chain state synchronization, a blockchain node's chain state can be initialized by using a previously verified backup, without having to perform the cryptographic verification for the backup at the time that the blockchain node is deployed, thereby resulting in faster deployment of a new blockchain node.

In a first implementation, the agent stores the backups (e.g., at the data storage system 160, in a storage medium included in an availability zone accessible by the compute instance that generates the snapshot, etc.). In a second implementation, the discovery system 198 receives the backups, and stores the backups. In a third implementation, the snapshotting system 197 receives the backups, and stores the backups.

In some variations, the agent performing the backups generates the metadata that is stored in association with the backups.

In some implementations, after the backing up of the chain state is complete, the node agent provides a snapshotting completed signal to the snapshotting system 197. In some implementations, in response to receiving a snapshotting completed signal, the snapshotting system 197 adds the snapshotted blockchain node back to the blockchain network (e.g., updating the routing table of the associated routing component) (e.g., S860 shown in FIG. 8).

Figure 4:
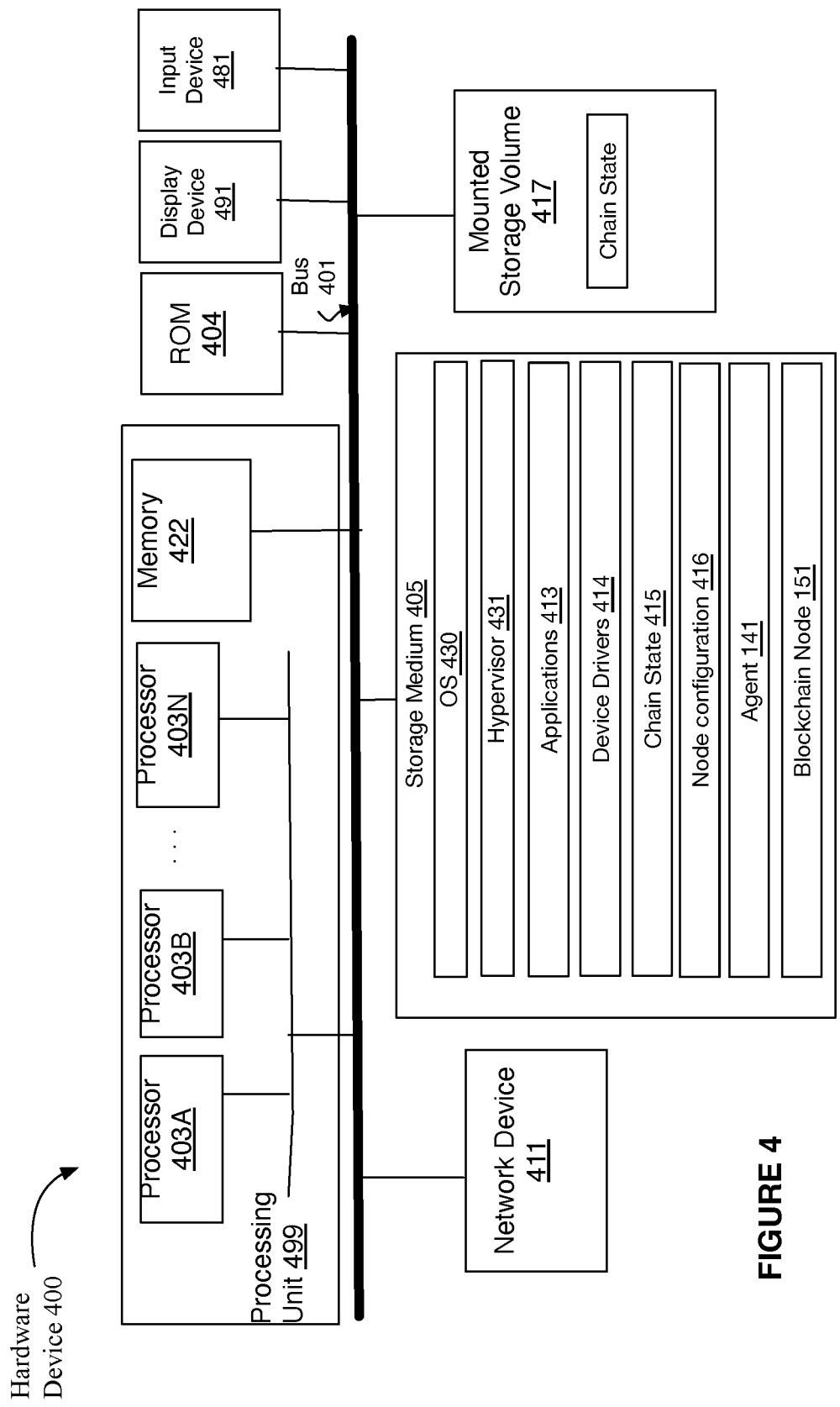
FIG. 4 is a schematic representation of a hardware device that can be used to implement the system, in accordance with variations.

In some variations, each blockchain node (e.g., 151) stores chain state (e.g., 415) in a dedicated storage device (e.g., 405 shown in FIG. 4). In some implementations, the storage device 405 is a local storage device (e.g., included in the hardware device hosting the blockchain node). In some implementations, the storage device 405 is a remote storage device (e.g., hosted by a cloud-based storage provider, a network attached storage, etc.). In some variations, the chain state 415 is stored in a data volume (of the storage device) that only includes chain state, and does not include other program instructions (e.g., 413) or data that is unrelated to chain state. In some variations, the chain state data volume is node agnostic, such that a chain state data volume can be snapshotted (e.g., by using a volume snapshot application or operating system service) and used by any other node as a source of the node's chain state.

In some variations, the method 200 can include using a routing component (e.g., gateway 121, load balancer 199) to perform advanced health-checks by dynamically adjusting load balancing weights for nodes based on determined health of the nodes. In some variations, the method can include using the routing component to automatically remove a node from the blockchain network based on determined health of the node.

In some variations, the method 200 can include remediation upon unexpected node termination. In some variations, in a case where a node terminates, the corresponding node agent informs the snapshotting system 197, and the snapshotting system 197 determines a remediation process based on the cluster state managed by the snapshotting system 197 (or managed by the discovery system 198). In some variations, the snapshotting system 197 uses the cluster state to determine whether to perform a soft remediation or a hard remediation. In some implementations, a soft remediation includes restarting the node by using the agent. In some implementations, a hard remediation includes shutting down the agent and deploying a new node agent and node.

In some variations, the method 200 can include rate limiting traffic received from specific client systems (e.g., 171) (for the nodes) by using a routing component. In some variations, the method 200 can include filtering (or rewriting) requests received from client systems (e.g., 171) (for the nodes) by using a routing component. In some variations, the method 200 can include using a routing component to filter (or rewrite) responses received from the nodes, and intended for client systems (e.g., 171) or other nodes. For example, the contents of a request can be parsed, and deemed safe or unsafe, according to a ruleset. Heuristics can be used to determine and categorize requests that are slow to run, or fail to complete consistently.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising: with a blockchain platform:
   generating a snapshot of chain state of at least one blockchain node included in a blockchain node cluster by using a respective node agent, comprising:
      identifying a node configuration to snapshot;
      identifying a node agent that manages a healthy blockchain node having the identified node configuration; and
      controlling the identified node agent to generate a snapshot of chain state of the blockchain node;
   storing the generated snapshot; and
   initializing chain state of a new blockchain node for a blockchain network by using a generated snapshot;
   wherein the blockchain node cluster processes blockchain requests by using at least one blockchain node included in the blockchain node cluster, and
   wherein after the chain state of the new blockchain node is initialized by using the generated snapshot, the new blockchain node synchronizes the chain state of the new blockchain node by communicating with other blockchain nodes that are communicatively coupled to the blockchain network.

2. The method of claim 1, wherein controlling the identified node agent to generate the snapshot of the chain state of the blockchain node comprises: controlling the node agent to stop the blockchain node.

3. The method of claim 1, wherein identifying the node agent comprises:
   accessing telemetry data for the blockchain node by using the node agent; and
   determining that the blockchain node is healthy by using the accessed telemetry data.

4. The method of claim 1, wherein storing the generated snapshot comprises: performing a cryptographic verification process to verify that blocks included in the snapshot satisfy requirements of a blockchain protocol of the blockchain network.

5. The method of claim 1,
   wherein the snapshot used to initialize the chain state includes a full backup and at least a most recent incremental backup, and
   wherein initializing the chain state of the new blockchain node for the blockchain network by using the generated snapshot comprises performing a cryptographic verification process for blocks included in the most recent incremental backup without performing the cryptographic verification process for other blocks included in the snapshot.

6. The method of claim 1 wherein storing the generated snapshot comprises storing the snapshot in a mountable storage medium.

7. The method of claim 1, wherein storing the generated snapshot comprises storing the snapshot in a cloud storage system.

8. The method of claim 1, wherein storing the generated snapshot comprises storing the snapshot as an incremental backup in response to a determination that a relevant backup already exists and can be combined with the incremental backup to initialize full chain state for a node configuration of the generated snapshot.

9. The method of claim 8, wherein a file system of a compute instance that runs the node agent generates the incremental backup.

10. The method of claim 1, wherein initializing chain state of the new blockchain node comprises: mounting a storage medium that stores the generated snapshot to a file system used by the blockchain node.

11. The method of claim 1, wherein initializing chain state of the new blockchain node comprises: downloading the generated snapshot from a cloud storage system and storing the downloaded snapshot in a storage medium accessible by a file system used by the blockchain node.

12. The method of claim 1 wherein identifying a node agent that manages a healthy blockchain node having the identified node configuration comprises: determining that the healthy blockchain node includes chain state that includes all blocks included in a full backup and at least one incremental backup for the node configuration.

13. The method of claim 1, wherein initializing chain state of the new blockchain node for the blockchain network by using the generated snapshot comprises:
   generating a new snapshot of the initialized chain state of the new blockchain node; and
   storing the new snapshot.

14. A method comprising: with a blockchain platform: for each of a plurality of blockchain node clusters:
   periodically generating snapshots of chain state of healthy blockchain nodes by using at least one node agent included in the cluster, and storing each generated snapshot;
   discovering a new blockchain node that has been deployed in the node cluster; and
   initializing chain state of the new blockchain node for a blockchain network by using a most recently generated snapshot.

15. The method of claim 14,
   wherein, for each cluster, periodically generating snapshots of chain state of healthy blockchain nodes by using at least one node agent included in the cluster comprises: determining health of at least one blockchain node by using telemetry data provided to the node agent by the at least one blockchain node, wherein for each generated snapshot, storing the generated snapshot comprises: performing cryptographic verification for the snapshot before storing the snapshot.

16. The method of claim 15, wherein for each of the plurality of blockchain network protocols, the blockchain platform generates a new snapshot in response to determining that a difference in time between a timestamp of a most recent snapshot for the blockchain network protocol and a current time exceeds a threshold time difference amount.

17. The method of claim 16, further comprising: with the blockchain platform: for each of the plurality of blockchain network protocols,
configuring the threshold time difference amount used to trigger generation of a snapshot for the blockchain protocol,
wherein for each blockchain network protocol, the threshold time difference amount is configured to satisfy startup time parameters for the blockchain network protocol.

18. The method of claim 14, wherein, for each cluster, the most recently generated snapshot is a snapshot that has been previously cryptographically verified before initializing the chain state.

19. The method of claim 14, wherein the blockchain platform manages blockchain node clusters for a plurality of blockchain network protocols, and periodically generates snapshots for each blockchain network protocol.

20. A method comprising: with a blockchain platform:
generating a snapshot of chain state of at least one blockchain node included in a blockchain node cluster by using a respective node agent, comprising:
identifying a node configuration to snapshot;
identifying a node agent that manages a healthy blockchain node having the identified node configuration;
controlling the identified node agent to generate a snapshot of chain state of the blockchain node;
storing the generated snapshot, comprising performing a cryptographic verification process to verify that blocks included in the snapshot satisfy requirements of a blockchain protocol of the blockchain network; and
initializing chain state of a new blockchain node for a blockchain network by using a generated snapshot.

21. A method comprising: with a blockchain platform:
generating a snapshot of chain state of at least one blockchain node included in a blockchain node cluster by using a respective node agent, comprising:
identifying a node configuration to snapshot;
identifying a node agent that manages a healthy blockchain node having the identified node configuration; and
controlling the identified node agent to generate a snapshot of chain state of the blockchain node;
storing the generated snapshot in a cloud storage system; and
initializing chain state of a new blockchain node for a blockchain network by using a generated snapshot.

* * * * *